(12) United States Patent
Ma

(10) Patent No.: US 8,555,905 B2
(45) Date of Patent: Oct. 15, 2013

(54) UMBRELLA HUB WITH CORD LOCK FEATURE

(75) Inventor: Oliver Joen-an Ma, Arcadia, CA (US)

(73) Assignee: Oliver Joen-an Ma, Arcadia, CA (US)

( * ) Notice: Subject to any disclaimer, the term of this patent is extended or adjusted under 35 U.S.C. 154(b) by 353 days.

(21) Appl. No.: 12/834,839

(22) Filed: Jul. 12, 2010

(65) Prior Publication Data

US 2011/0017249 A1 Jan. 27, 2011

Related U.S. Application Data

(63) Continuation-in-part of application No. 12/353,128, filed on Jan. 13, 2009, now Pat. No. 7,861,734.

(51) Int. Cl.
*A45B 25/06* (2006.01)
*A45B 25/08* (2006.01)

(52) U.S. Cl.
USPC ................................................ 135/28; 135/38

(58) Field of Classification Search
USPC ........................................ 135/28, 37, 38, 39
See application file for complete search history.

(56) References Cited

U.S. PATENT DOCUMENTS

| | | | |
|---|---|---|---|
| 2,743,696 A | 5/1956 | Maxwell |
| 2,745,421 A | 5/1956 | Russell |
| 2,786,551 A | 3/1957 | Bennett |
| 2,867,875 A | 1/1959 | Davison |
| 3,683,948 A | 8/1972 | Cohen |
| 3,708,967 A | 1/1973 | Geist et al. |
| 4,567,907 A | 2/1986 | Dubinsky |
| 4,606,366 A | 8/1986 | Collet |
| D320,111 S | 9/1991 | Ma |
| 5,085,239 A | 2/1992 | Chin-Hung et al. |
| 5,193,566 A | 3/1993 | Chen |
| 6,253,823 B1 | 7/2001 | Swopes |
| 6,386,214 B1 | 5/2002 | Clarke |
| 6,802,329 B2 | 10/2004 | Chen |
| 6,889,699 B2 | 5/2005 | Clarke |

(Continued)

FOREIGN PATENT DOCUMENTS

| | | |
|---|---|---|
| DE | 9412939 | 10/1994 |
| EP | 0628264 | 12/1994 |
| EP | 0829598 | 3/1998 |
| GB | 2299366 | 10/1996 |

OTHER PUBLICATIONS

Extended European Search Report received in corresponding European Application No. EP 11250655.5, Dated Sep. 27, 2011, 6 pages.

(Continued)

*Primary Examiner* — David Dunn
*Assistant Examiner* — Danielle Jackson
(74) *Attorney, Agent, or Firm* — Knobbe Martens Olson & Bear, LLP

(57) ABSTRACT

An umbrella hub is provided that is operative to engage an umbrella cord for maintaining an umbrella in an open position. The hub can comprise a cord retention mechanism. For example, the hub can comprise upper and lower hub portions that form a hub body and a cord retention mechanism comprising an aperture extending through the hub body, a recess disposed within the upper or lower hub portion, and a pair of engagement members disposed in the recess. The cord lock mechanism can be configured to allow the cord to pass freely in a first direction while preventing movement of the cord therethrough in a second direction that is opposite the first direction or to pass freely in both the first and second directions.

24 Claims, 18 Drawing Sheets

(56) References Cited

U.S. PATENT DOCUMENTS

| | | |
|---|---|---|
| 7,293,573 B2 | 11/2007 | Clarke |
| 7,861,734 B2 | 1/2011 | Ma |
| 8,356,613 B2 | 1/2013 | Ma |
| 2002/0046761 A1 | 4/2002 | Liang |
| 2003/0178050 A1 | 9/2003 | Wu |
| 2004/0177871 A1 | 9/2004 | Harbaugh |
| 2007/0062565 A1 | 3/2007 | Clarke |
| 2009/0260664 A1 | 10/2009 | Ma |
| 2011/0132418 A1 | 6/2011 | Ma |

OTHER PUBLICATIONS

Partial European Search Report received in corresponding European Application No. EP 10 25 0052, Dated Mar. 22, 2010, 6 pages.

European Search Report received in corresponding European Application No. EP 10 25 0052, Dated Oct. 4, 2010, 10 pages.

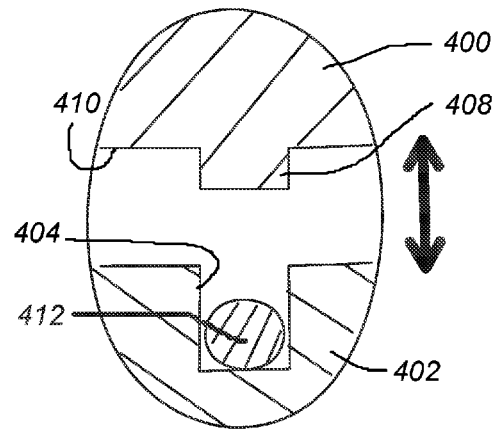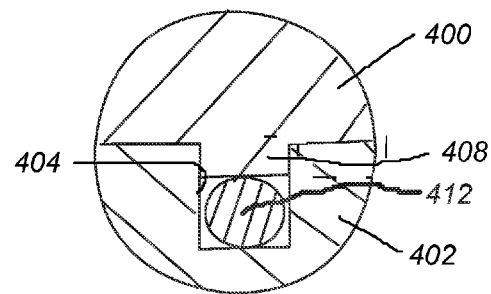
FIG. 21A  FIG. 21B
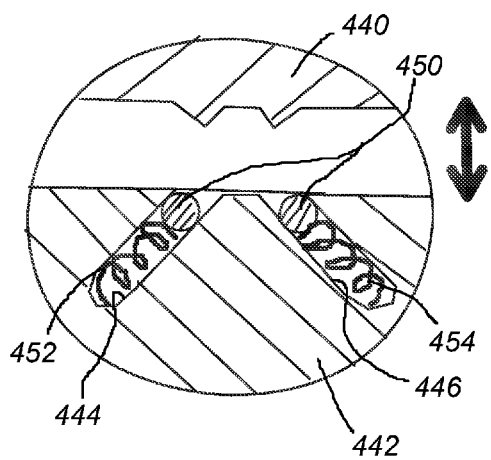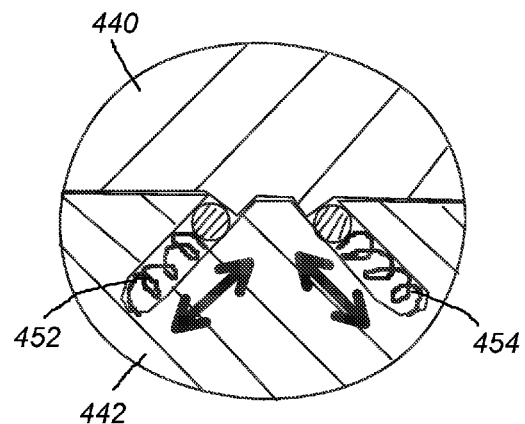
FIG. 22A  FIG. 22B

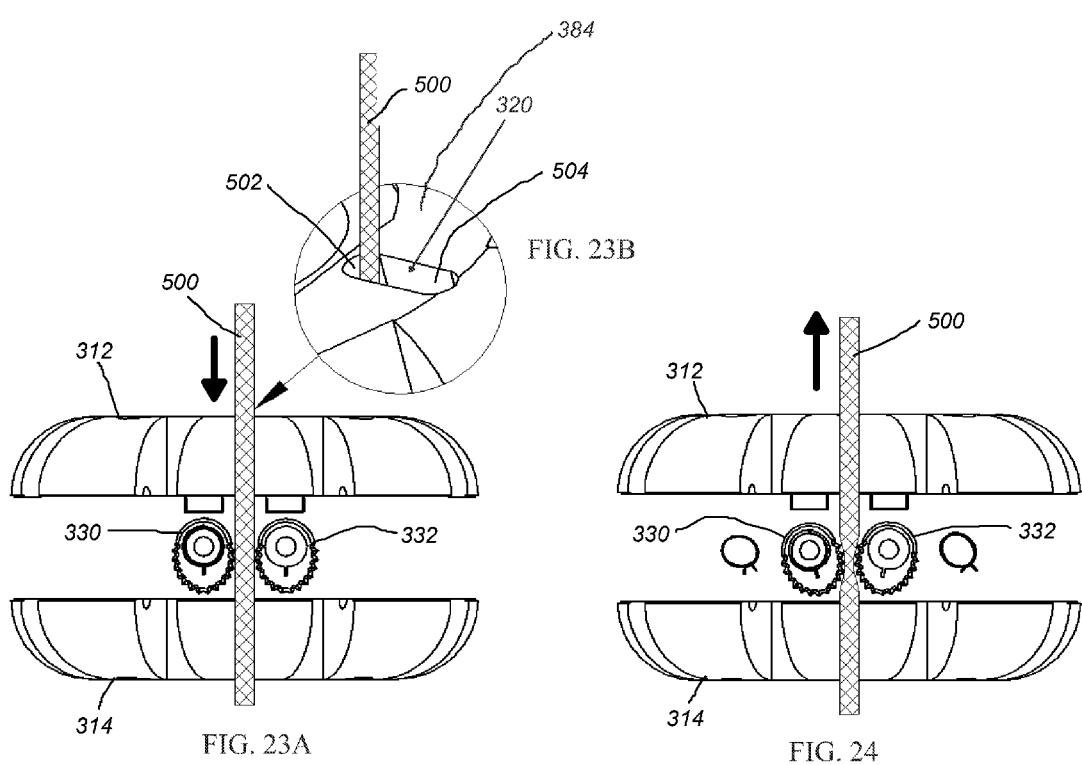

UMBRELLA HUB WITH CORD LOCK FEATURE

CROSS-REFERENCE TO RELATED APPLICATIONS

This application is a continuation-in-part of U.S. application Ser. No. 12/353,128, filed Jan. 13, 2009, the entirety of which is hereby incorporated herein by reference.

BACKGROUND

1. Field of the Inventions

The present inventions relate generally to shade structures and devices that can be used to maintain a shade structure in an open position. More specifically, the present inventions relate generally to an umbrella hub that comprises a cord retention device for engaging an umbrella cord to maintain tension in the cord for maintaining an umbrella in an open position.

2. Description of the Related Art

The use of umbrella shade structures generally requires that a canopy member be opened to provide shade over a given area. In many of these structures, the canopy may be attached to a moveable assembly of the structure. When the assembly is moved from a closed to an open position, the canopy can be deployed to thereby provide shade. Likewise, the canopy can be stowed when the assembly is retracted to the closed position.

Umbrellas provide a relatively simply moveable assembly that is coupled with a canopy. The movable assembly is attached to a center pole and, in some cases, will have a sliding component that moves along the pole to allow the assembly to be moved between open and closed positions. When the assembly is moved to the open position, the weight of the canopy and the assembly itself can exert a closing force on the assembly that urges the assembly towards the closed position.

In order to counteract the closing force on the umbrella, the umbrella may incorporate one or more structures or means to maintain the assembly and the canopy in the open position. For example, a latch or pin can be used to limit the movement of the sliding component relative to the umbrella pole. In this manner, the assembly and the canopy can be secured against closing to maintain the umbrella in an open position.

SUMMARY

An aspect of at least one of the embodiments disclosed herein is the realization that the connection devices used in the assembly of shade structures, such as pavilions and outdoor umbrellas, can be improved to provide a more secure, quicker, and more reliable connection. Such devices can use fewer parts and be easier to manufacture than those devices of the prior art. Such improved connections can be particularly advantageous for large shade structures which can sometimes be unwieldy.

In accordance with an embodiment, an umbrella hub is provided that can comprise a hub body and cord retention means. The umbrella hub can be used in combination with an umbrella having a pole, a first hub that is slidably disposed on the pole, and a cord that extends between the first hub and the umbrella hub.

The hub body can comprise an upper hub portion and a lower hub portion coupled to the upper portion. The hub body can have a series of projections extending outwardly from a central portion thereof. The umbrella hub can also comprise an aperture extending through the upper and lower hub portions of the hub body. The aperture can be configured to allow a cord to pass therethrough.

The cord retention means can comprise a cord retention mechanism or engagement device configured for engaging with or disengaging the cord. For example, the engagement device can be configured to move between an engaged position and a disengaged position for engaging with or disengaging the cord. The engagement device can be aligned with the aperture of the hub body such that the cord can be disposed through the aperture to be engaged with or disengaged from the engagement device. The engagement device can thus allow the cord to pass freely in a first direction through the aperture while preventing movement of the cord in a second direction opposite the first direction.

In some embodiments, the hub body can comprise a recess. The recess can be formed in the first hub portion and/or the second hub portion. The aperture can extend through the first and second hub portions and through the recess. In such embodiments, the cord retention means can be disposed in the recess and selectively engage the cord passing through the aperture. For example, the recess can be enclosed within the hub body and can be configured to at least partially receive the engagement device therein and to allow the engagement device to move between the engaged position and the disengaged position for engaging or disengaging the cord.

The engagement device can comprise at least one engagement member configured for engaging with or disengaging the cord. For example, the engagement member can be configured to move between an engaged position and a disengaged position for engaging with or disengaging the cord. In some embodiments, a pair of engagement members is used to engage the cord. The engagement member can be aligned with the aperture of the hub body such that the cord can be disposed through the aperture to be engaged with or disengaged from the engagement member. The engagement member can allow the cord to pass freely in a first direction through the aperture while preventing movement of the cord in a second direction opposite the first direction.

The cord retention mechanism or engagement device can be configured such that the engagement members are rotatable gear members configured to engage the cord. The engagement members can be cam-shaped. Further, the engagement members can allow downward movement of the cord relative to the hub and prevent upward movement of the cord relative to the hub. The rotatable gear member can also be cylindrically shaped.

The recess can be configured to enclose the engagement member(s) when the first and second hubs are assembled together. In some embodiments, the first hub portion is a lower hub portion and the second hub portion is an upper hub portion. Thus, the recess can be formed in the lower hub portion, and the engagement members can be contained entirely within the lower hub portion. However, the recess can also be formed in both hub portions.

The first and second hub portions can form a hub body having a series of projections extending outwardly from the hub body. Further, the second hub portion can comprise at least one insertion member configured to be inserted into the recess of the first hub portion. The insertion member can be configured to be inserted into a slot formed within the recess such that the insertion member provides a vertical restraint to restrain movement of at least a portion of the engagement member relative to the hub body. Furthermore, the engagement member can be constrained against horizontal and vertical movement within the recess.

Further, the aperture can comprise an engaging section and a disengaging section. The engaging section can be aligned with the engagement members such that the engagement members can engage with the cord to prevent movement of the cord in the second direction. The disengaging section can be misaligned with the engagement members such that the cord can move freely in the first or second direction.

BRIEF DESCRIPTION OF THE DRAWINGS

The above-mentioned and other features of the inventions disclosed herein are described below with reference to the drawings of the preferred embodiments. The illustrated embodiments are intended to illustrate, but not to limit the inventions. The drawings contain the following figures:

FIGS. 21A-22B are cross-sectional side view taken at 21A/B-21A/B and 22A/B-22A/B in Figure illustrating embodiments of cord retention mechanisms having different configurations of recesses and slots for supporting an engagement member.

FIG. 23A is an exploded side view of the umbrella hub of FIG. 17 wherein a cord is illustrated in a released position, according to an embodiment.

FIG. 23B is a detailed perspective view of the upper portion of the hub illustrating the passage of the cord into the hub, according to an embodiment.

FIG. 24 is an exploded side view of the umbrella hub of FIG. 17 wherein the cord is illustrated in an engaged position, according to an embodiment.

DETAILED DESCRIPTION

Figure 1:
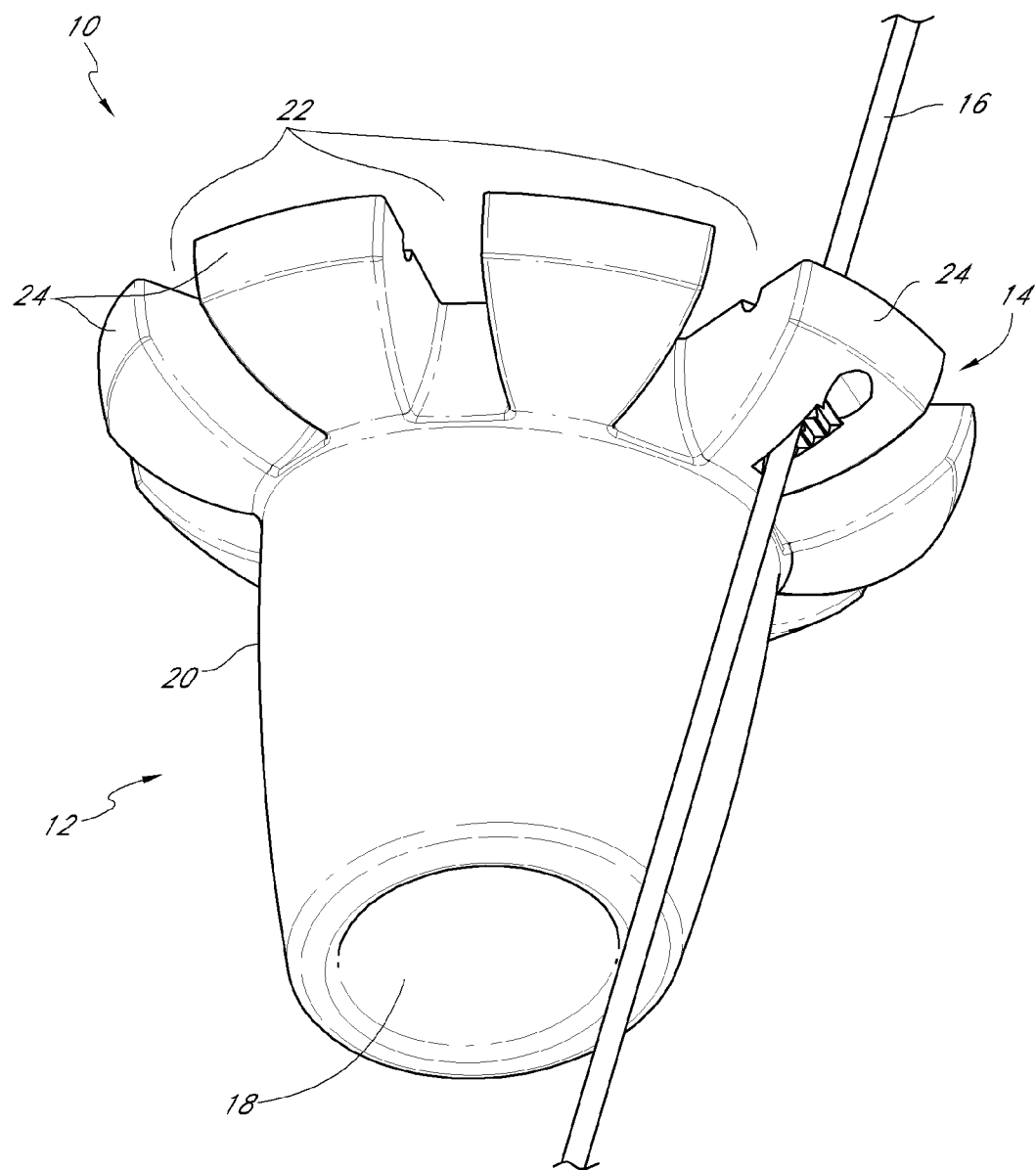
FIG. 1 is a bottom perspective view of an umbrella hub comprising a cord retention device and a cord disposed through the cord retention device, according to one embodiment.

In accordance with various embodiment of the present inventions, there are provided various configurations of a hub that can be used with an umbrella support structure, such as an umbrella or pavilion, to facilitate the rapid and secure deployment of the support structure to an open position and maintaining the support structure in the open position. In some embodiments of the support structure that comprise a cord to control opening and closing of the support structure, the hub can comprise a cord retention device, which restrains movement of the cord so as to maintain the support structure in an open position. As described in greater detail herein, embodiments of the cord retention device can incorporate various features to provide a secure engagement with the cord.

One of the disadvantages of prior art hubs and cord retention devices is that these devices require a multitude of parts and substantial manual labor to assemble the hub and the cord retention device. The devices generally comprise several individual components that must be carefully assembled by hand. As a result, the cost and time required for production of such devices is high.

In contrast, embodiments disclosed herein provide for hubs and cord retention devices that can be easily formed using minimal parts and assembly time. For example, some of the embodiments disclosed herein provide for an umbrella hub with an integrated cord retention device. In such embodiments, the hub can be configured such that components of the cord retention device are injection molded with the hub. Thus, in some embodiments, upper and lower hub portions can be injection molded and assembled together without any additional parts to form a hub with an integrated cord retention device. For example, the hub and the cord retention device can be formed together of a monolithic or continuous single piece of material, such as by injection molding, to form a cord retention hub. In other embodiments, the hub can be injection molded and assembled with minimal additional parts to form a hub with an integrated cord retention device. In any of the embodiments, the manufacturing and assembly time can be shorter than that required by the prior art.

Another disadvantage associated with prior art hubs and cord retention devices is that the cord path in these devices is obstructed. For example, in an umbrella, a first, fixed end of the cord is attached to a lower hub, the cord extends upwardly toward an upper hub and around a pulley member of the upper hub, and back down to the lower hub where a second, free end of the cord can be grasped by a user to open or close the umbrella. In use, the free end of the cord is pulled downwardly to cause the lower hub to rise toward the upper hub to open the umbrella. The free end of the cord can then be attached to or fixed along the umbrella pole or lower hub to maintain tension in the cord to thereby maintain the raised position of the lower hub. However, even though an umbrella may use a device for fixing the free end cord, the travel path of the cord along its free end is obstructed.

An obstructed travel path can be created, for example, when the travel path of the free end of the cord from the upper hub down to the lower hub is non-linear. In particular, the free end of the cord must be forced around an edge or structure of the umbrella (that is not the cord retention device) before reaching the cord retention device. As a result, several problems can occur. First, the rope can become worn and may experience fraying and/or failure due to friction with and contact against the edge or structure of the umbrella. Additionally, such devices can be difficult to operate because the user must not only hold the free end of the cord in tension, but must also force the free end of the cord into the cord retention device after changing direction of the cord. Finally, the obstructed travel path may weaken the connection between the free end of the cord and the cord retention device such that the cord can be easily unintentionally and undesirably dislodged during use.

For example, U.S. Pat. No. 7,293,573, issued to Clarke, illustrates an umbrella pulley system that uses a cam cleat member. The cam cleat member includes a pair of cams that are pivotally mounted to the exteriorly exposed surface of the base portion of the main hub member below the main hub member. In use, a line member of the pulley system is drawn over the main hub member and placed between the pair of cams to prohibit the movement of the line member in either direction. The main hub member will thereby be maintained in a vertical position along the pole member. However, line member is exposed against the outer surface of the main hub member. Thus, the line member is radially misaligned with the cam cleat member. Notably, as the line member extends downwardly, the line member must bend around the perimeter of the main hub member and bend radially inwardly toward the cam cleat member. This exposed and obstructed cord travel path, as described above, can cause disengagement of the line member from the cam cleat member. As a result, unexpected closing of the umbrella can occur. Further, as mentioned above, the drawbacks associated with such a device are numerous and include, inter alia, cord wear, difficulty placing the cord in the cord retention device, and difficulty maintaining placement of the cord in the device during use.

In contrast, various embodiments disclosed herein provide an obstruction-free travel path of the free end of the cord. Thus, cord life can be extended, the engagement of the cord with the cord retention device can be secure, and the user can easily place or mount the cord into the cord retention device. These advantages are obtained through some embodiments due at least in part, to the integral construction of the hub and the cord retention device. In other words, several embodiments provide for a hub that is integrally formed with the cord retention device. Other embodiments may provide for a cord passage that extends through the hub toward the cord retention device. In these embodiments, the travel path of the free end of the cord is configured to reduce and/or eliminates contact between the free end of the cord and an edge or component of the shade structure. In some embodiments, the travel path is configured to eliminate or significantly reduce contact between the free end or a lower length of the cord and any edge or component of the shade structure that is not part of the cord retention device.

In accordance with aspects of at least some of the embodiments disclosed herein, the umbrella hub can provide other significant advantages. For example, because the umbrella hub and the cord retention device can be combined into a single component and, in some cases, formed of very few parts, these embodiments can be more robust, less complex, and have fewer failure modes. In other words, the simplicity of these embodiments provides not only an aesthetic benefit, but the mechanical benefit to use that fewer parts can be damaged through regular use. Additionally, various embodiments disclosed herein provide for an umbrella hub that has no protruding or exposed cord retention components. Thus, the rigors of typical use including bumps, contact with the canopy, and exposure to the elements will generally not affect the operation or otherwise damage the hub and the cord retention device.

Referring now to the drawings wherein the showings are made for purposes of illustrating preferred embodiments of the present inventions and not for purposes of limiting the same, FIG. 1 is a bottom perspective view of an umbrella hub assembly 10 comprising a hub portion 12 and a cord retention device 14. As will be appreciated by those of skill in the art, the hub portion 12 in the illustrated hub assembly 10 of FIGS. 1-3 can be a lower hub portion of the hub assembly 10. In this regard, an upper hub portion can be attached to the hub portion 12 to complete the hub assembly 10. Other embodiments shown and described further herein illustrate upper hub portions. For ease in illustrating and describing this embodiment, the hub portion 12 is shown without the upper hub portion. However, in accordance with this embodiment, as well as other embodiments, an upper hub portion can be used in the hub assembly 10, as described further below.

FIG. 1 illustrates the hub portion 12 with an umbrella cord 16 that is disposed through the cord retention device 14, according to an embodiment of the present inventions. As shown, the cord retention device 14 can be integrally formed with the hub portion 12. For example, the cord retention device 14 and the hub portion 12 can be injection molded as a single, monolithic part. In other words, it is contemplated that in injection mold can be made that allows a single injection of resin to be used to form the hub portion 12 with the cord retention device 14. Thus, in such an embodiment, no additional components would be necessary. In some embodiments, this monolithic component can be combined with an upper hub portion, and any fasteners to fasten the hub portion 12 to the upper hub portion.

In the illustrated embodiment, the hub portion 12 can comprise a central aperture 18 for receiving an umbrella pole or pavilion pole therethrough. The hub portion 12 comprises a hub body 20. The hub body 20 can be formed to include a plurality of connection cavities 22. The connection cavities 22 can be configured to receive a rib of an umbrella or pavilion support structure (not shown). In this regard, the connection cavities 22 can be formed between protrusions 24 of the body 20 of the hub portion 12. Accordingly, as illustrated, in some embodiments the cord retention device 14 can be formed in the body 20 of the hub portion 12. Further, the cord retention device 14 can be formed or disposed in a protrusion 24 of the body 20. In some embodiments, it is contemplated that the protrusion 24 can be configured to allow the cord 16 to past therethrough. Such an embodiment is described and illustrated further below.

Figure 2:
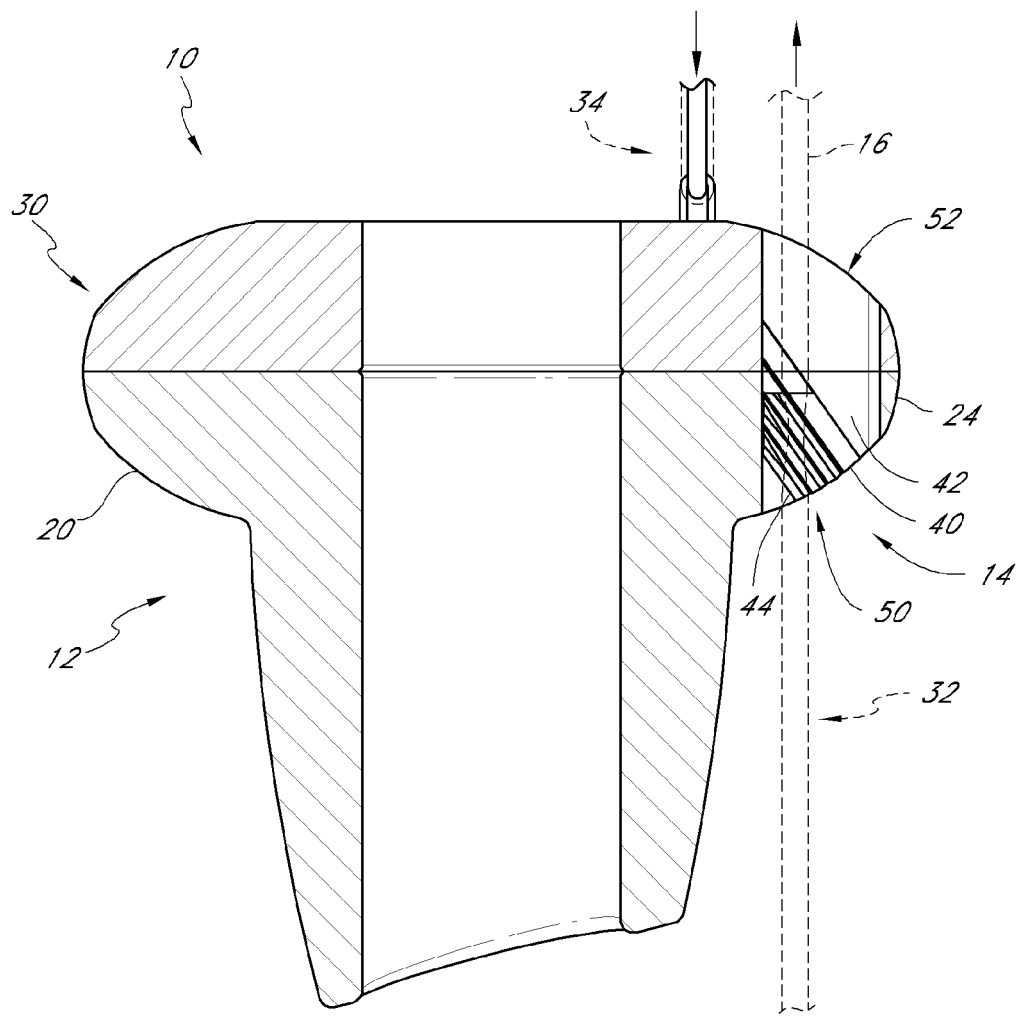
FIG. 2 is a cross-sectional side view of the umbrella hub of FIG. 1 illustrating an embodiment of the cord retention device.

FIG. 2 is a cross-sectional side view of the umbrella hub assembly 10 of FIG. 1 illustrating an embodiment of the cord retention device 14, which is formed in the hub portion 12. In accordance with an embodiment, FIG. 2 also illustrates an upper hub portion 30 that is attached to the hub portion 12. A separate or separable upper hub portion 30 is not required. An umbrella cord 16 is also shown in dashed lines. Further, the umbrella cord 16 defines a free end 32 and a fixed end 34. The fixed end 34 of the cord 16 can be attached to the upper hub portion 30 (or directly to the hub portion 12) in order to facilitate the raising or lowering of the hub assembly 10.

As similarly described above, the hub assembly 10 can be moved by a user up and down in umbrella pole to open or close the umbrella canopy. The cord 16 can be looped around a pulley member attached to an upper hub or upper portion of the umbrella or pavilion structure. Accordingly, if a user desires to open in the umbrella, the user can pull down on the free end 32 of the cord 16, which will cause the fixed end 34 to pull the hub assembly 10 upwardly. However, due to the gravitational force and corresponding weight of the moving umbrella components, the free end 32 of the cord 16 must be fixed at least temporarily to maintain the umbrella structure in an open position. Arrows are used to illustrate the travel direction of the cord 16 due to the gravitational force. Therefore, as described herein, various embodiments, including the embodiment illustrated in FIGS. 1-4, are provided to enable a user to fix the cord 16 relative to the hub assembly 10.

One of the unique advantages of the embodiment illustrated in FIGS. 1-4 is that the cord retention device 14 takes advantage of the upward force transmitted by the cord 16 to secure the cord 16 relative to the assembly 10. In this regard, the cord retention device 14 can be configured as a slot 40 disposed through the body 20 of the hub portion 12. The slot 40 can comprise one or more interior surfaces 42. Additionally, in this embodiment, the interior surfaces 42 can comprise one or more raised portions 44. The raised portions 44 can be configured as elongate ridges. The ridges need not be elongate in all embodiments, but preferably are configured to bite into the cord 16 in opposition to the force transmitted thereby. In one configuration the ridges define a triangular cross-section. For example, the raised portions 44 can be configured to provide a tooth-like engagement with the cord 16 in the slot 40.

In embodiments wherein the raised portions 44 are configured as elongate ridges, the raised portions 44 can extend in a direction that is generally transverse relative to a longitudinal axis A of the hub portion 12. In some embodiments, the raised portions 44 can upwardly extend at an angle relative to the longitudinal axis A of the hub portion 12.

Further, the raised portions 44 can be distributed along the interior surfaces 42 of the slot 40 such that the slot 40 defines an engagement zone 50 and a passage zone 52. The engagement zone 50 can be that area of the slot 40 that is used to engage or retain the cord 16. The passage zone 52 can be that area of the slot 40 that allows the cord 16 to move freely either in and upward or downward direction. In the illustrated embodiment, the engagement zone 50 is located along the left side of the slot 40. In other words, slot 40 of the illustrated embodiment can engage the cord 16 if the cord 16 is drawn radially inwardly towards the longitudinal axis A of the hub portion 12. Further, the cord 16 can be moved freely up or down relative to the hub portion 12, if the cord 16 is moved radially outward into the passage zone 52 away from the longitudinal axis A of the hub portion 12.

Figure 3:
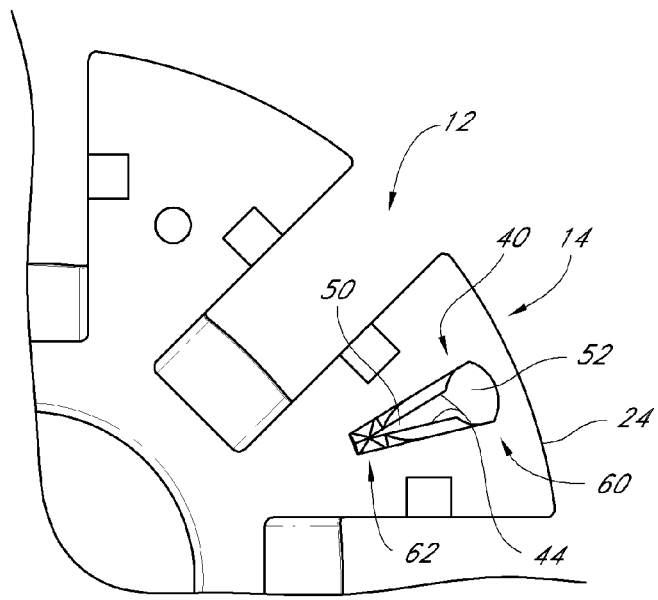
FIG. 3 is a top view of a portion of the umbrella hub of FIG. 1 illustrating a top section of the cord retention device.
Figure 4:
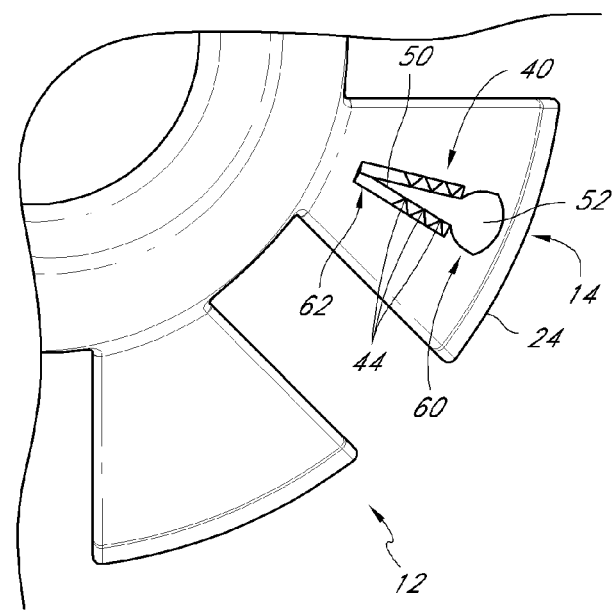
FIG. 4 is a bottom view of a portion of the umbrella hub of FIG. 1 illustrating a bottom section of the cord retention device.

With reference to FIGS. 3 and 4, top and bottom sections of the hub portion 12 are shown to illustrate further details of the construction of the hub portion 12 with the cord retention device 14. These figures illustrate that these slot 40 can comprise a variable width. For example, the slot 40 can comprise a wide section 60 and a narrowed section 62. The wide section 60 can correspond to the passage zone 52 of the slot 40. Accordingly, when the cord 16 is disposed in the wide section 60 of the slot 40, the cord is in the passage zone 52 and can easily be moved up or down relative to the hub portion 12.

One of the unique advantages of embodiment wherein the slot 40 has a variable width is that the shape and orientation of the raised portions 44 and the width of the slot 40 can be configured to facilitate self-locking of the cord 16. Thus, the user can easily raise the hub assembly 10 by pulling down on the cord 16 and then gently urging the cord 16 toward the narrowed section 62 of the slot 40 such that the cord 16 is engaged by the raised portions 44 and the upward force of the cord 16 causes the cord 16 to be drawn into the engagement zone 50 of the slot 40. Therefore, the upward force of the cord 16 will cause the cord 16 to become lodged into the engagement zone 50 of the slot 40. In order to dislodge or disengage the cord 16, the user can pull down and out on the cord 16 such that the cord 16 moves downwardly and radially outward along the diagonal raised protrusions 44 until the cord 16 is in the passage zone 52.

In some embodiments, the raised portions 44 can extend along the interior surfaces 42 of the slot 40 in only the hub portion 12. However, it is contemplated that the raised portions 44 may also extend along the interior surfaces 42 of the slot 40 in both the hub portion 12 and the upper hub portion 30. Further, it is noted that the raised portions 44 can extend in a generally diagonal direction relative to the longitudinal axis A of the hub 12. As illustrated, the raised portions 44 can extend upwardly toward the longitudinal axis A. However, in other embodiments, it is contemplated that the raised portions 44 can extend upwardly away from the longitudinal axis A. In such embodiments, the slot 40 can be configured with the engagement zone 50 being disposed radially outwardly from the passage zone 52. Thus, to engage the cord 16 with the assembly 10, a user would need to pull down on the cord 16 and pull the cord 16 radially outwardly so as to urge the cord 16 toward the engagement zone 50 of the slot 40.

As described above, such an embodiment can provide significant advantages, such as reduced manufacturing and assembly costs. Furthermore, such an embodiment can also provide a discrete yet robust design that is mechanically and aesthetically desirable.

Figure 5:
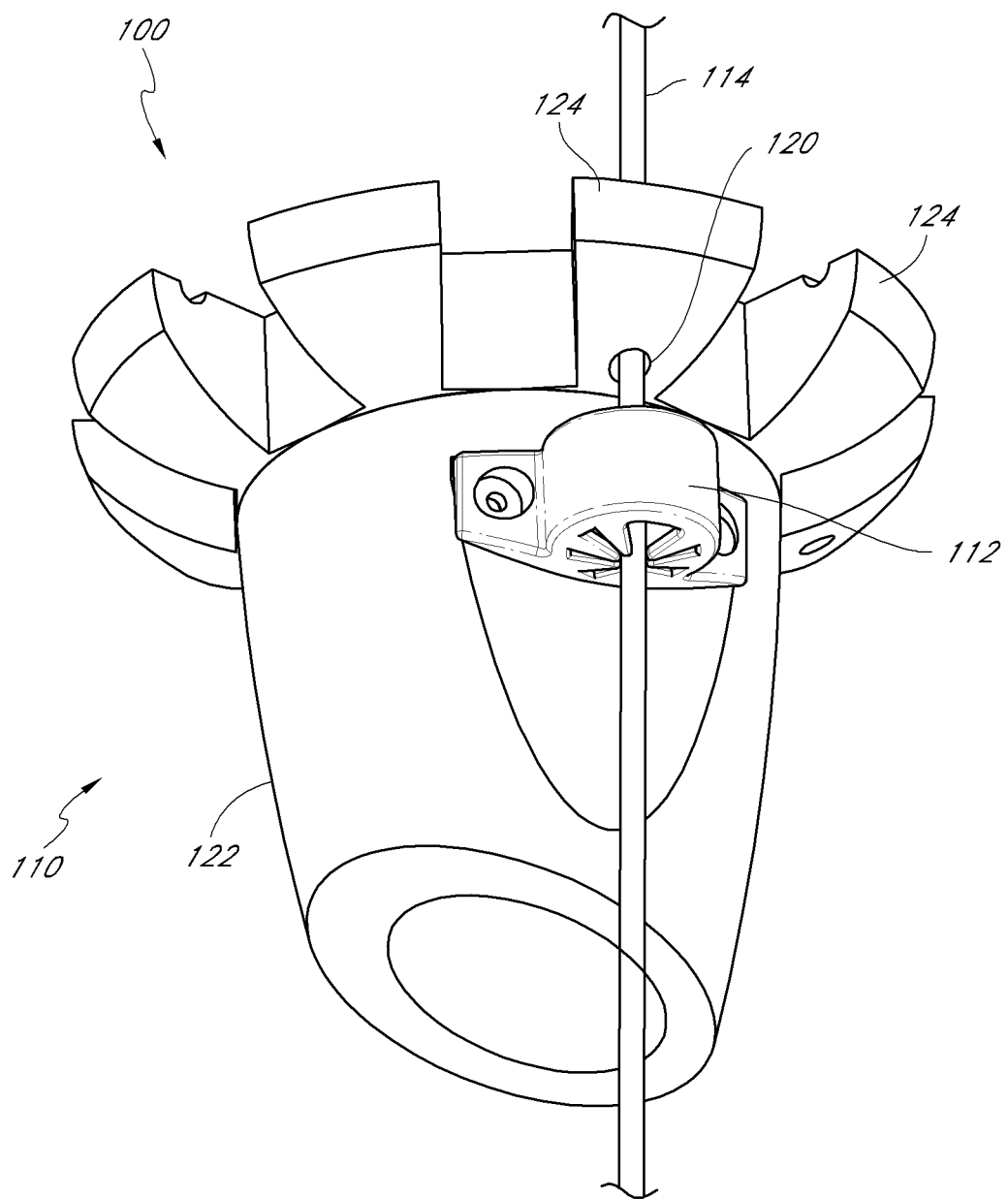
FIG. 5 is a bottom perspective view of an umbrella hub comprising a cord retention device and a cord disposed through the cord retention device, according to another embodiment.

Another embodiment is illustrated by FIG. 5-9. FIG. 5 is a bottom perspective view of an umbrella hub assembly 100 comprising a hub portion 110 and a cord retention device 112. FIG. 5 also illustrates a cord 114 disposed through the cord retention device 112. As described above with regard to the embodiment shown in FIGS. 1-4, the hub assembly 100 can comprise an upper hub portion and a lower hub portion. Further, the hub portion 110 can correspond to the lower hub portion of the assembly 100. Other details and features of the hub assembly 100, such as the engagement of the upper and lower hub portions with ribs of an umbrella support structure can be the same as that described above with regard to FIGS. 1-4. Accordingly, these details will not be reproduced for this embodiment.

FIG. 5 illustrates that the hub portion 110 comprise an aperture 120 extending through a body 122 of the hub portion 110. The aperture 120 can extend through a protrusion 124 of the hub portion 110. In this regard, the aperture 120 can also be formed in an upper hub portion of the assembly 100 such that the cord 114 can pass downwardly through the assembly 100 toward the cord retention device 112.

Figure 6:
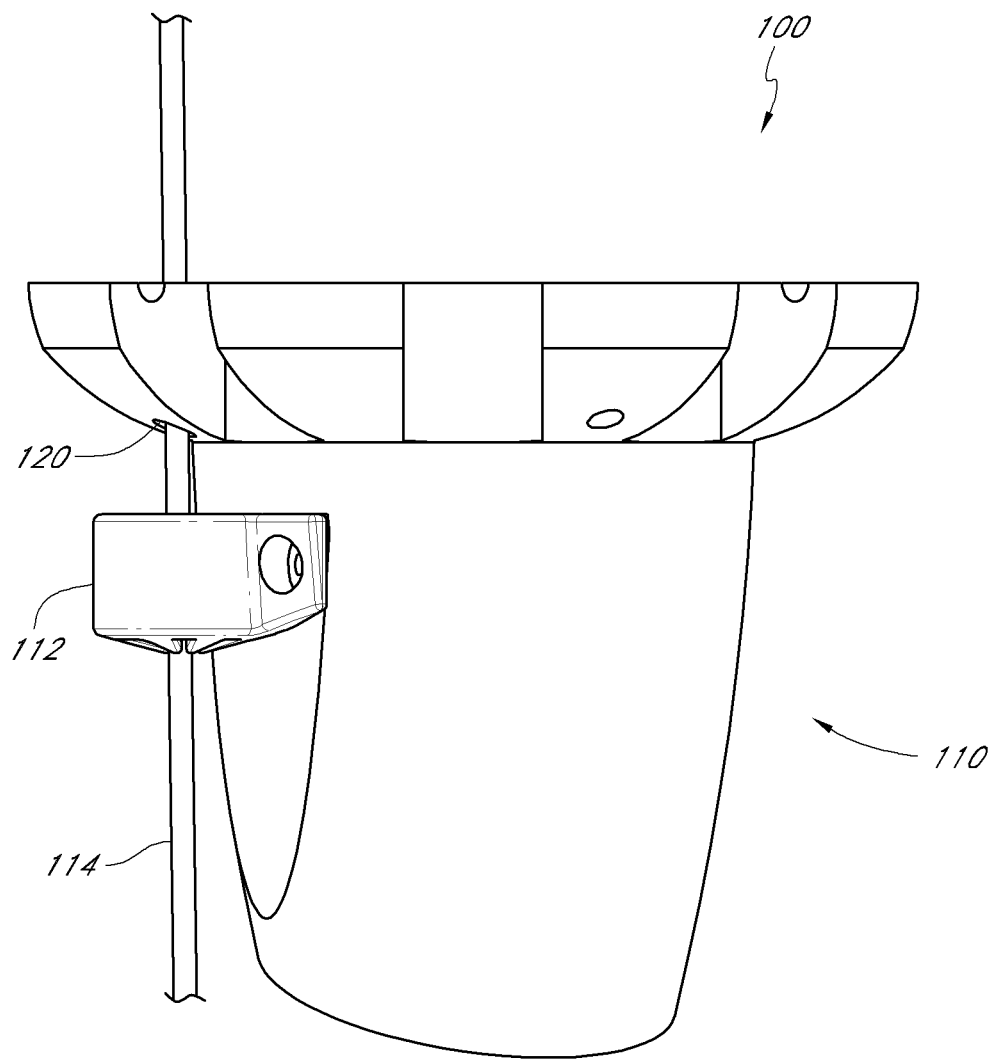
FIG. 6 is a side view of the umbrella hub of FIG. 5 illustrating the cord retention device.
Figure 7:
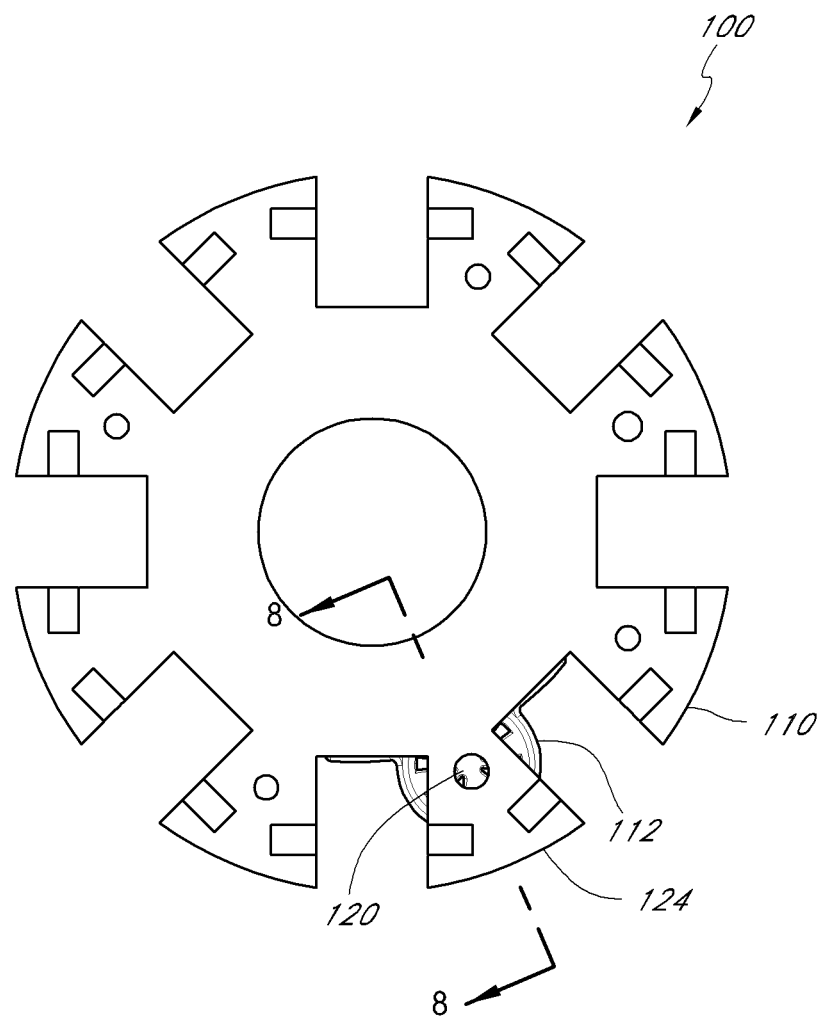
FIG. 7 is a top view of the umbrella hub of FIG. 5 illustrating a through path of the cord through the umbrella hub and the cord retention device.

FIGS. 6-7 illustrate the side and top views of the assembly 100 shown in FIG. 5. Similar to the embodiment discussed above with respect to FIGS. 1-4, the operation of the assembly 100 takes advantage of the upward force of the cord 114 when the assembly 100 has been raised to open the umbrella structure. FIGS. 5 and 6 illustrate that the cord retention device 112 can be coupled with, e.g., attached to, the hub portion 110. In this regard, the cord retention device 112 can be formed as a single component that is fastened to an outer surface of the hub portion 110. Further, the cord retention device 112 can be fastened to the hub portion 110 generally below and aligned with the aperture 120.

Figure 8:
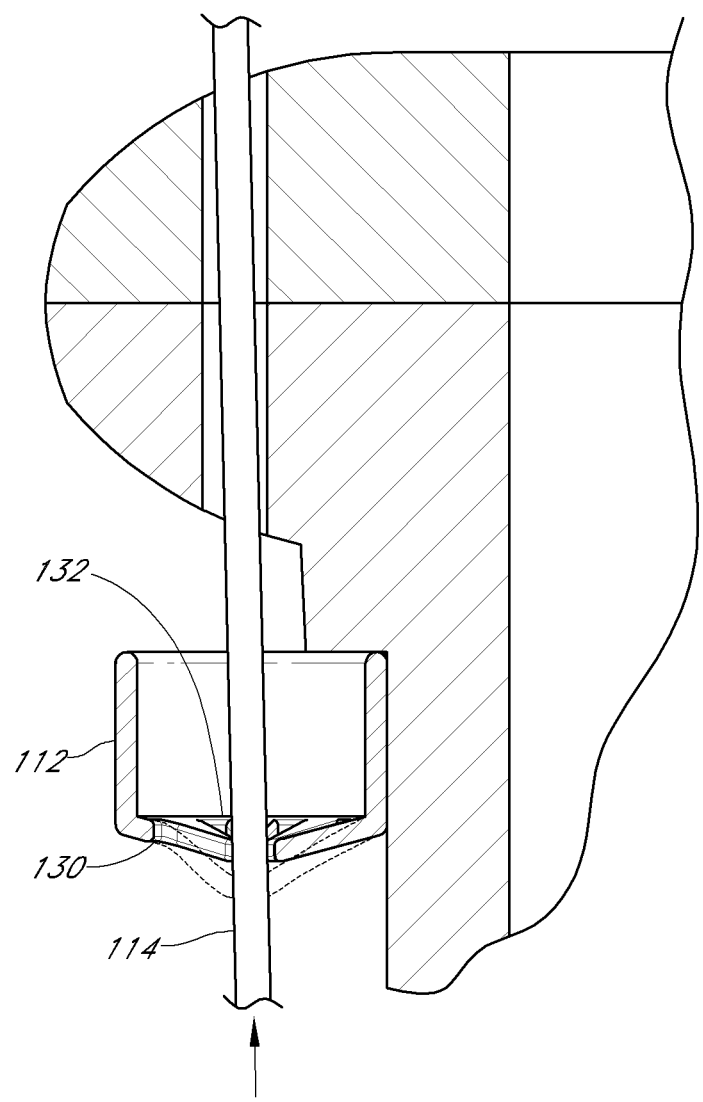
FIG. 8 is a cross-sectional side view of the cord retention device of the umbrella hub of FIG. 5, illustrating a passing position and an engaged position of the cord retention device for allowing passage or restricting movement of the cord through the cord retention device.

FIG. 8 illustrates an operational principle of the cord retention device 112. As shown, the cord retention device 112 can comprise a plurality of teeth 130 that point inwardly with respect to an outer body of the device 112 toward an engagement section 132. In some embodiments, each of the teeth 130 can extend generally radially inwardly towards a center longitudinal axis of the cord retention device 112. As will be described further below with reference to FIGS. 9-10, the teeth 130 can be oriented transversely relative to the center longitudinal axis of the cord retention device 112. In particular, the teeth 130 can be oriented to extend at a downward angle relative to the center longitudinal axis toward the center longitudinal axis. In one embodiment, the teeth 130 extend in a non-horizontal orientation such that a free end thereof is at a lower elevation than a free end thereof. Thus, as the cord 114 is pulled downwardly, the teeth 130 will deflect to allow the cord 114 to pass downwardly through the engagement section 132. However, if the cord 114 moves upwardly, the teeth 130 will engage in the cord 114 and prevent upward movement of the cord 114 through the engagement section 132. In other words, the engagement section 132 of the cord retention device 112 can allow one-way movement of the cord 114. Any suitable angle of orientation of the teeth 130 can be used, such as for example, the teeth 130 can be oriented at approximately a 20°-40° relative to a horizontal plane.

Further, in some embodiments, each of the teeth 130 can be of a sufficient length such that if several or all of the teeth 130 are deflected upwardly, the teeth 130 can converge and/or collapse into each other to prevent any of the teeth 130 from being deflected to point in an upward direction. An arrow is shown to illustrate the upward force of the cord 114. As such, even if the upward force of the cord 114 is great, the teeth 130 will not become inverted such that the cord 114 moves upwardly through the engagement section 132. In this manner, the teeth 130 will undergo compressive stresses as they converge, rather than simple bending stresses, to prevent inversion of the teeth 130. Additionally, it is contemplated that the teeth 130 can define a variable cross-sectional geometry to enhance the interference of the teeth 130 as they converge.

Figure 9:
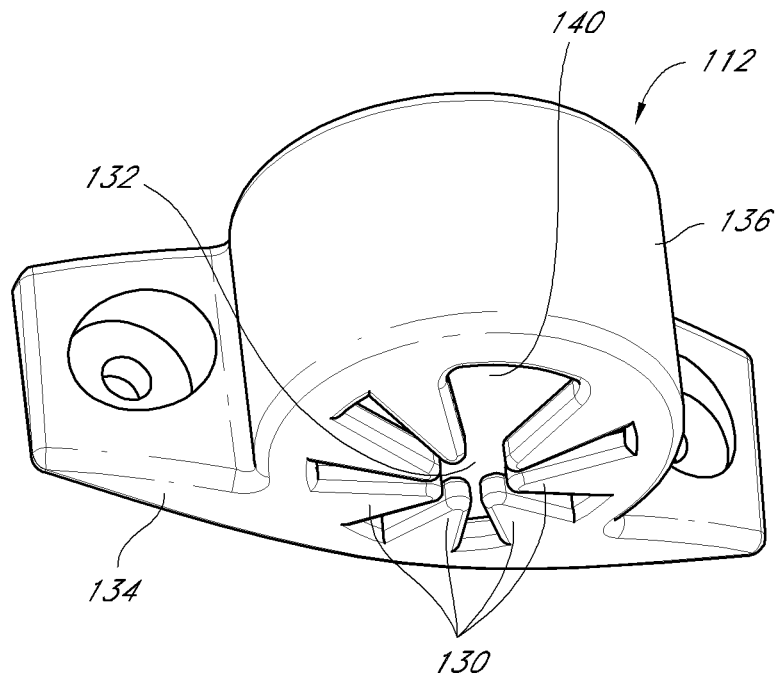
FIG. 9 is a detailed bottom perspective view of the cord retention device of the umbrella hub of FIG. 5.
Figure 10:
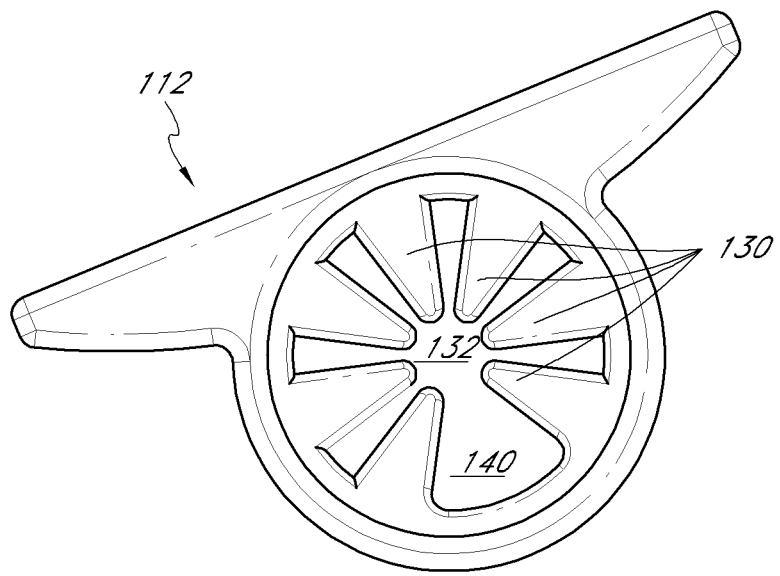
FIG. 10 is a top view of the cord retention device shown in FIG. 9.

FIG. 9 is a bottom perspective view of the cord retention device 112 that can be used with the assembly 100. Further, FIG. 10 is a top view of the cord retention device 112. As shown therein, the cord retention device 112 can comprise a base 134 and a housing 136. The base 134 can be configured to facilitate attachment of the cord retention device 112 to the hub portion 110. Further, the housing 136 can be formed as an annular structure through which the cord 114 can pass. Further, the plurality of teeth 130 extend from the housing 136 and converge inwardly toward the engagement section 132.

However, FIGS. 9 and 10 also illustrate that the cord retention device 112 can further comprise a passage section 140. The passage section 140 can be configured to allow the cord 114 to be disposed therethrough for allowing free movement in the upward or downward directions.

Thus, a user can open the umbrella by pulling down on the cord 114 and urging the cord 114 into the engagement section 132 of the cord retention device 112. However, in order to close the umbrella, the user must first pull down on the cord 114, and while pulling the cord 114 down, urge the cord 114 into the passage section 140 of the cord retention device 112.

Figure 11:
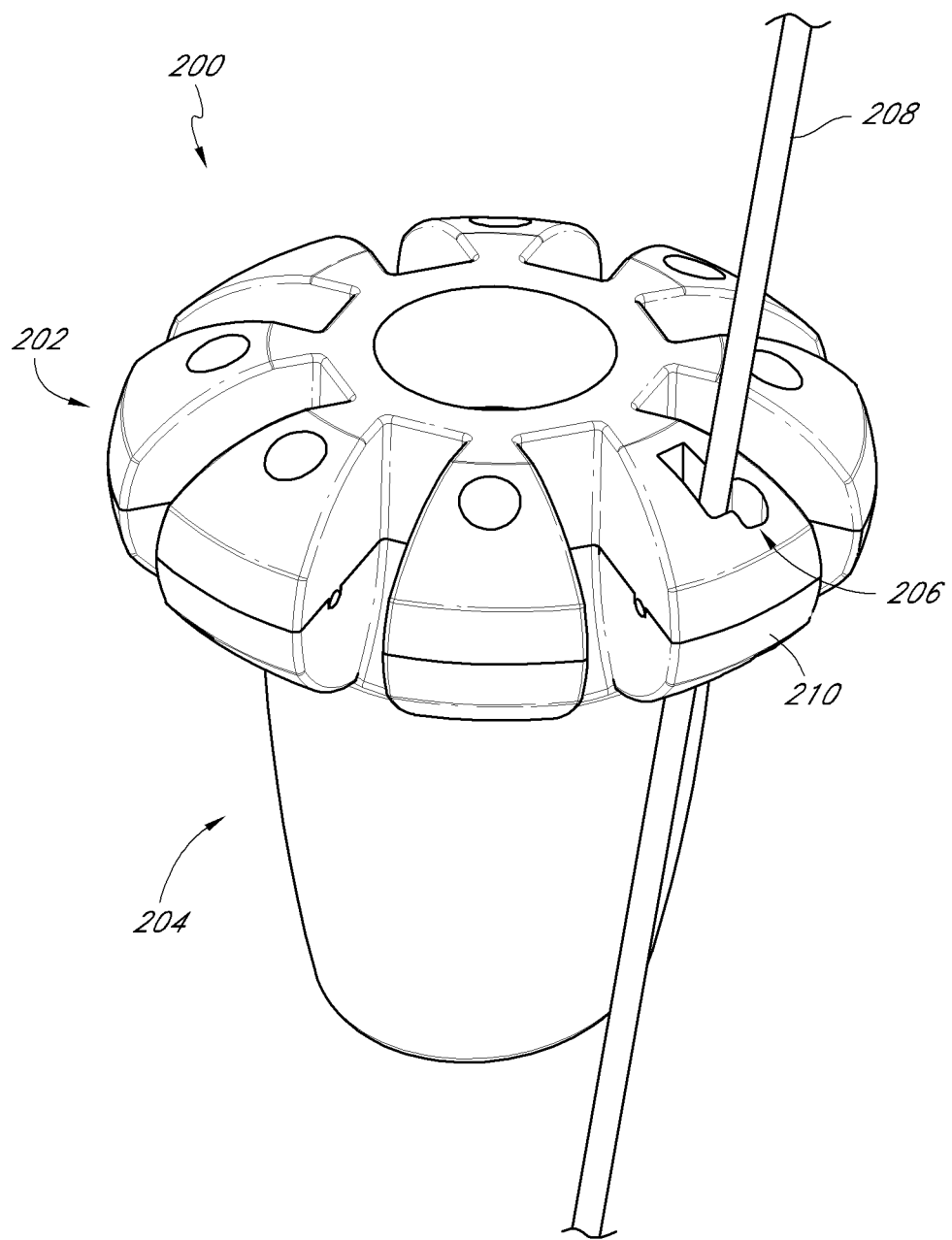
FIG. 11 is a top perspective view of an umbrella hub comprising a cord retention device and a cord disposed through the cord retention device, according to another embodiment.

FIGS. 11-16 illustrate additional embodiments of umbrella hubs and cord retention devices. FIG. 11 is a top perspective view of an umbrella hub assembly 200 comprising an upper hub portion 202, a lower hub portion 204, and a cord retention device 206. The cord retention device 206 is formed in the upper and lower hub portions 202, 204. Further, as illustrated, a cord 208 is disposed through the cord retention device 206. As the embodiments described above, the assembly 200 can be configured such that either or both of the cord retention device 206 or the cord 208 is disposed through a portion of the body of the hub assembly 200. For example, either or both of the cord retention device 206 or the cord 208 can be disposed through a protrusion 210 formed by the upper and lower hub portions 202, 204, as shown in FIG. 11.

Figure 12:
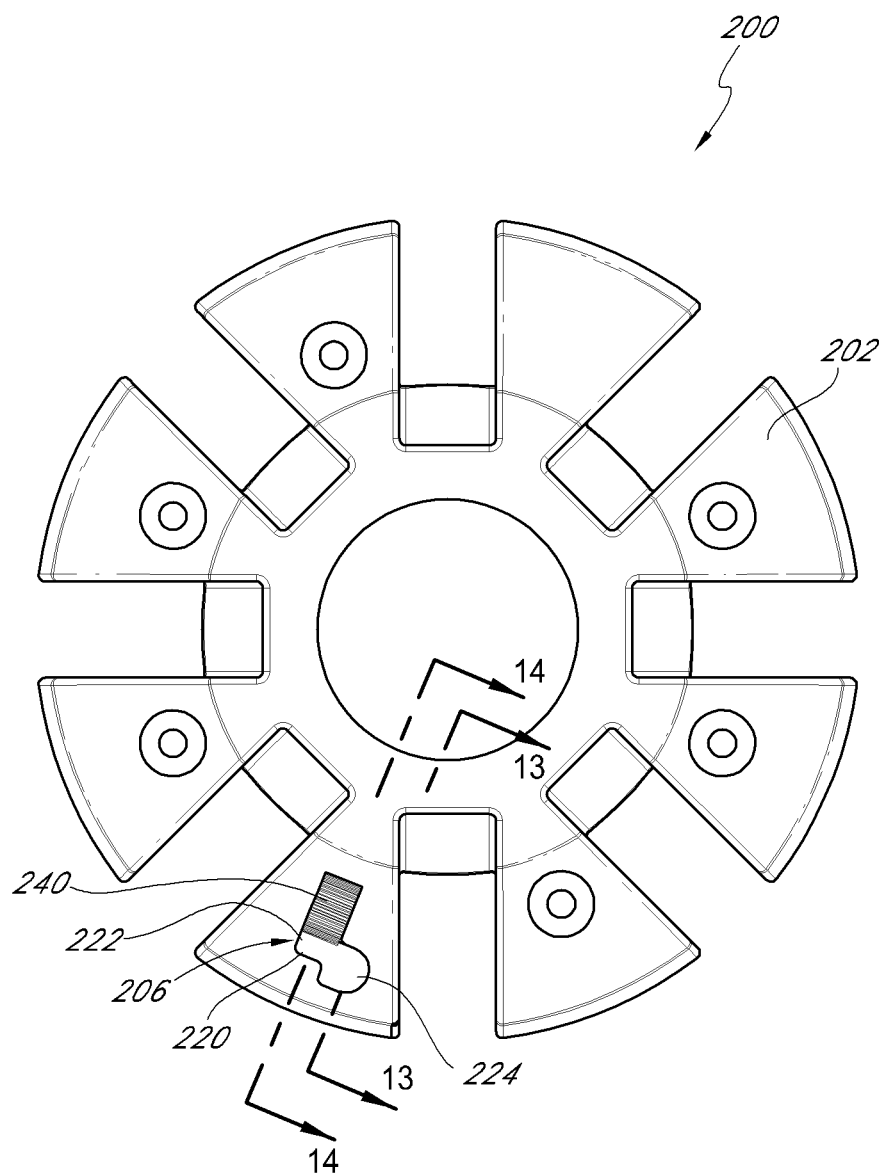
FIG. 12 is a top view of the umbrella hub of FIG. 11 illustrating a through path of the cord through the umbrella hub and the cord retention device.

FIG. 12 is a top view of the umbrella hub assembly 200 of FIG. 11 illustrating a through path of the cord 208 through the umbrella hub assembly 200 and the cord retention device 206. Similar to the embodiments described above, the cord retention device 206 can comprise an aperture 220 that defines a narrow or engagement section 222 and a wide or passage section 224. However, the embodiments illustrated in FIGS. 11-16 can further comprise a rotatable gear member 240. The gear member 240 can be configured to rotate in a single direction to allow the cord 208 to be drawn downwardly through the engagement section 222, but to resist upward movement of the cord 208 through the engagement section 222. Thus, in this embodiment, the cord 208 can pass freely in an upward or downward direction when the cord 208 is positioned in the passage section 224. However, the cord 208 can be restrained by the gear member 240 when positioned in the engagement section 222.

Figure 13:
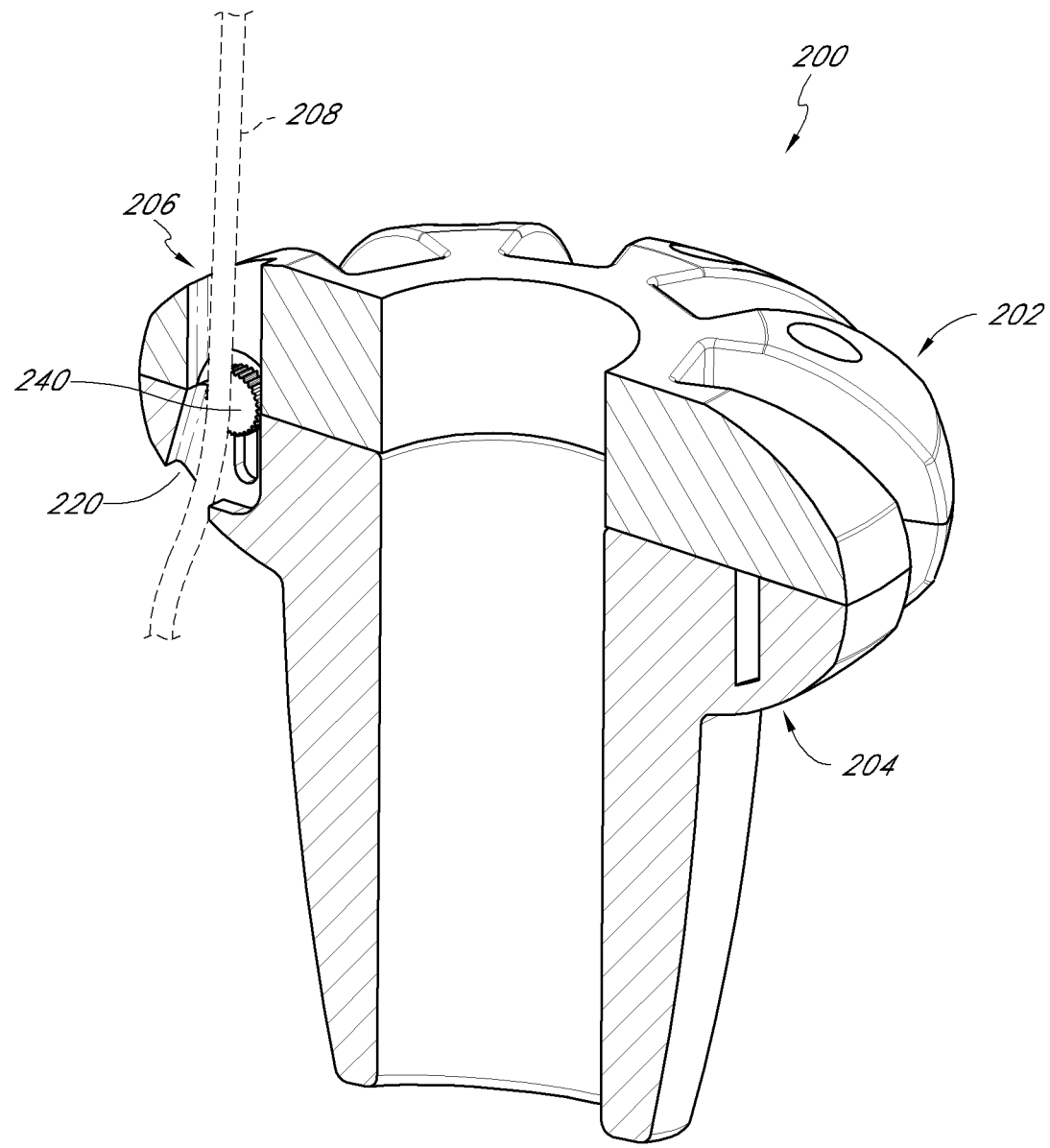
FIG. 13 is a cross-sectional top perspective view of the umbrella hub of FIG. 11 wherein the cord is illustrated in a floating position, according to an embodiment.

In this regard, FIG. 13 is a cross-sectional side view of the umbrella hub 200 of FIG. 11 wherein the cord 208 is illustrated in a floating position in the passage section 224, according to an embodiment. A floating position is one in which the cord 208 can move either in an upward direction or a downward direction without being held by the retention device 206. In one embodiment, the floating position is one in which the cord 208 is disposed on a side of the retention device 206 such that components of the retention device do not engage the cord 208.

Figure 14:
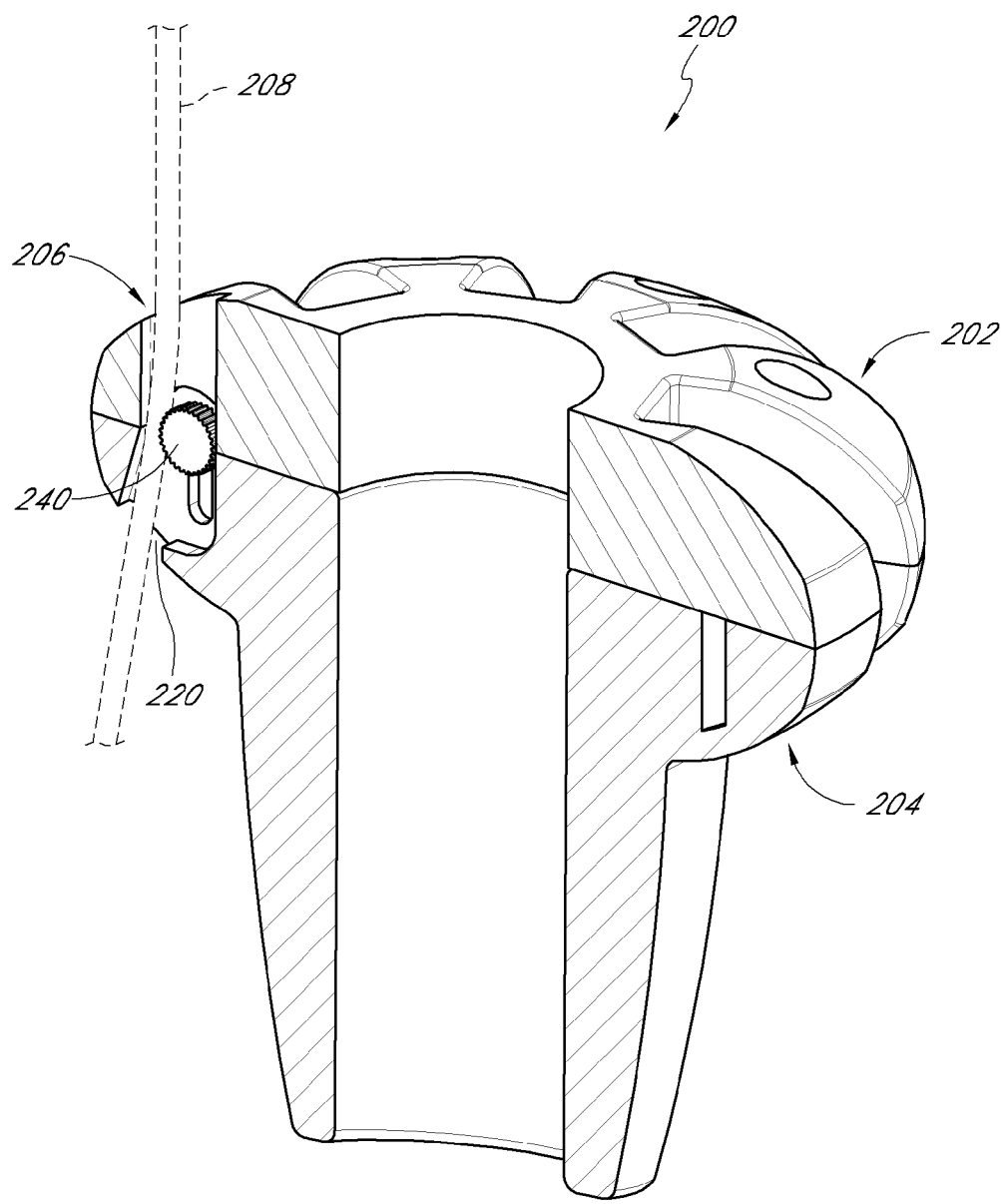
FIG. 14 is a cross-sectional top perspective view of the umbrella hub of FIG. 11 wherein the cord is illustrated in a captured position, according to an embodiment.

FIG. 14 is another cross-sectional side view of the umbrella hub 200 of FIG. 11 wherein the cord 208 is illustrated in a captured position in the engagement section 222, according to an embodiment. In this embodiment, the cord 208 is held between a component of the retention device 206, such as the gear member 240, and the body of the hub 200.

Figure 15:
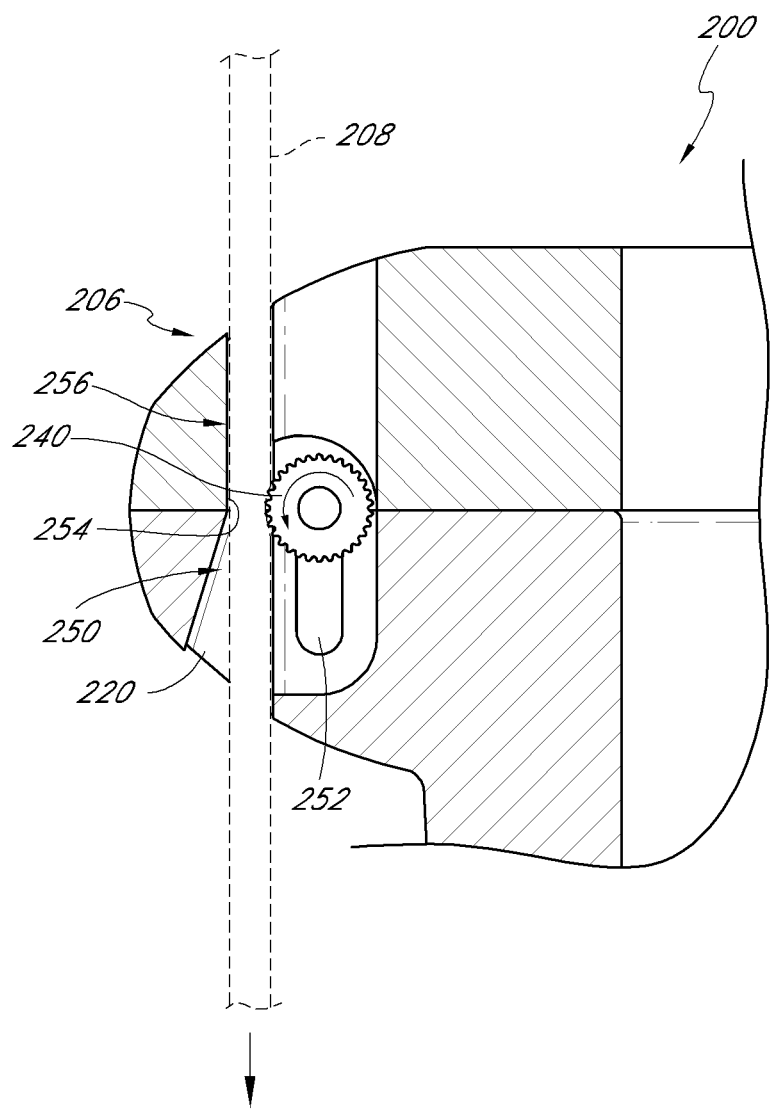
FIG. 15 is a cross-sectional side view of a portion of an umbrella hub including a cord retention mechanism comprising a translatable gear member, according to an embodiment.

FIG. 15 is a cross-sectional side view of the umbrella hub 200 illustrating further features of and the operation of the cord retention device 206, according to an embodiment. As shown therein, the cord 208 is disposed through the engagement section 222 of the aperture 220. In some embodiments, the aperture 220 can be configured to comprise a widened lower section 250. Further, the gear member 240 can be rotatable and translatable relative to the aperture 220.

In such an embodiment, when the cord 208 is pulled downwardly through the engagement section 222, and the gear member 240 will rotate in a counterclockwise direction (specific to the view FIG. 15) and be translated downwardly along a slot 252 formed in the aperture 220. In turn, when the cord 208 moves upwardly through the engagement section 222 of the aperture 220, the gear member 240 will be urged upwardly until it reaches the top of the slot 252 and will then engage the cord 208 to prevent the further upward movement thereof. As the cord 208 is engaged by the gear member 240, the gear member 240 will be drawn upwardly along the slot 252 into a narrow section 256 of the aperture 220 until the cord 208 is engaged or captured between the gear member 240 and an engagement surface 254 of the engagement section 222. Accordingly, the cord 208 can be prevented from further upward movement due to the upward translation of the gear member 240 toward the narrow section 256 of the aperture 220. In some embodiments, the gear member 240 is not translatable and is fixed in elevation at the location shown in FIG. 15.

Figure 16:
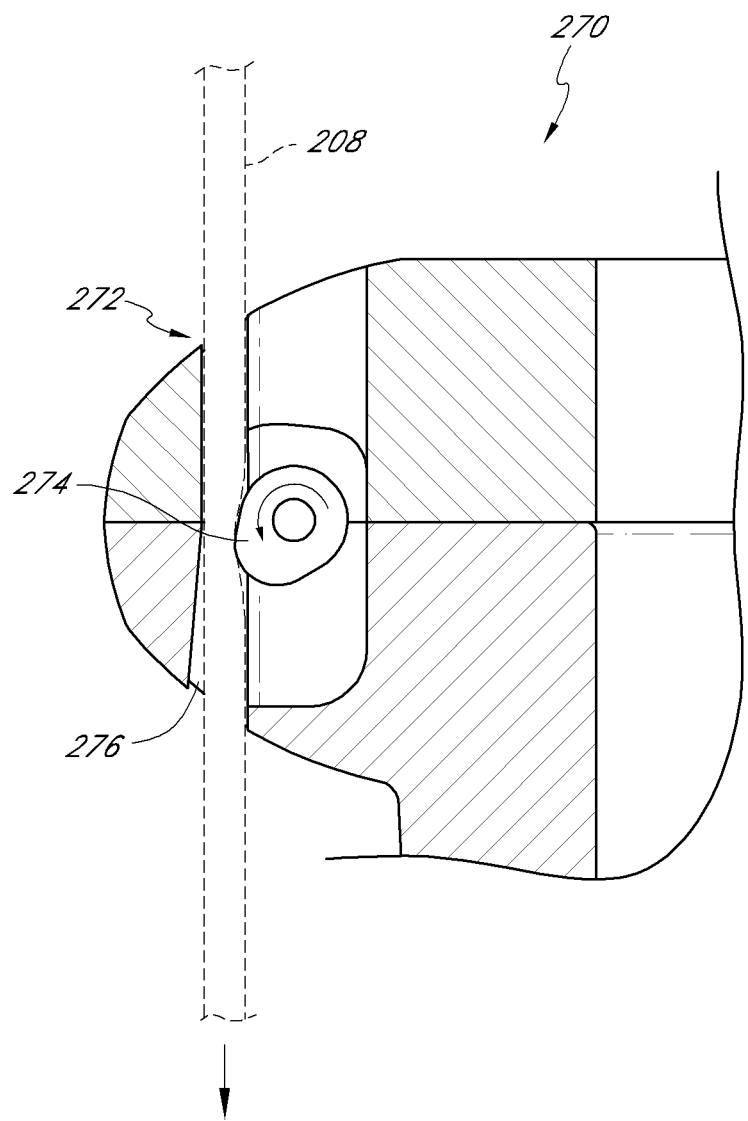
FIG. 16 is a cross-sectional side view of a portion of another umbrella hub including another cord retention mechanism comprising a cam member, according to another embodiment.

FIG. 16 illustrates an additional embodiment of a cord retention device 272 that can be used in an umbrella hub assembly 270 similar to that described above with reference to FIGS. 11-15. The cord retention device 272 includes a rotatable cam member 274. Similar to the embodiment described above with reference to FIGS. 11-15, downward movement of the cord 208 causes the cam member 274 to rotate in a counterclockwise direction, thus allowing the cord 208 to move freely in a downward direction. However, when the cord 208 moves in an upward direction, the cam member 274 rotates in a clockwise direction such that the cam member 274 engages the cord 208 to prevent further upward movement of the cord 208 relative to the assembly 270.

In the above embodiments using a gear member 240 or a cam member 274, the external surface of these members 240, 274 can comprise a friction enhancing coating or surface structure, such as one or more protrusions or teeth, in order to facilitate engagement with the cord. In accordance with yet other embodiments, the present inventions can also comprise one or more umbrellas comprising any of the hubs.

Figure 17:
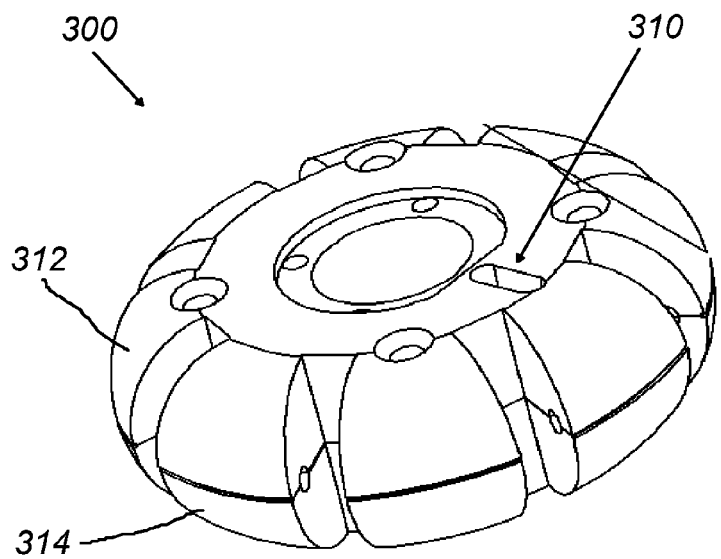
FIG. 17 is a top perspective view of an umbrella hub comprising a cord retention device, according to another embodiment.

FIGS. 17-24B illustrate aspects of other umbrella hubs and cord retention devices according to other embodiments. FIG. 17 is a top perspective view of an umbrella hub 300 comprising a cord retention device 310, according to another embodiment. The umbrella hub 300 can comprise a hub body that comprises an upper hub portion 312 and a lower hub portion 314. The upper and lower hub portions 312, 314 can be interconnected using fasteners such as screws, bolts, clips or other structures built into or separate from the upper and lower hub portions 312, 314. As with other embodiments disclosed herein, the hub 300 can comprise a plurality of connection cavities that can be configured to accept a plurality of umbrella structural members.

The cord retention device 310 can comprise an aperture extending through the hub body, a recess disposed within the upper or lower hub portion, and a pair of engagement members disposed in the recess. The cord retention device can be configured to allow a cord of the umbrella to pass freely in a first direction while preventing movement of the cord therethrough in a second direction that is opposite the first direction or to pass freely in both the first and second directions.

In some embodiments, the cord retention device 310 can comprise an aperture 320 that extends through the upper and lower hub portions 312, 314. Further, the cord retention device 310 can comprise a pair of engagement members 330, 332 which can be mounted within the hub 300. The engagement members 330, 332 can be spaced and configured to engage a cord extending through the aperture 320. In particular, the engagement members 330, 332 can allow the cord to move in one direction (e.g., downwardly as discussed below) while restricting movement of the cord in an opposite direction (e.g., upwardly as discussed below). Thus, the cord retention device 310 can securely engage the cord of the umbrella in order to maintain a selected elevation or position of the hub 300 or other hub that is actuated by the cord to maintain the umbrella in an open and/or closed position.

The cord retention device 310 can comprise one or more retention mechanisms, engagement devices, or engagement members, such as those disclosed in the cord retention devices 14, 112, 206, and 272 which are illustrated in any of FIGS. 1-24. The cord retention device 310 can comprise a retention mechanism or engagement member disposed in a recess 340 of the hub 300. The recess 340 can house one of a variety of retention mechanisms. For example, the recess 340 can house at least one rotatable member, such as that disclosed in the embodiment of the cord retention device 206. Further, the recess 340 can house at least one cam member such as that disclosed in the embodiments of the cord retention device 272. The recess 340 can also house angled ridges or raised portions, such as those disclosed in the embodiment of the cord retention devices 14. Furthermore, the recess 340 can house teeth, such as those disclosed in the embodiments of the cord retention devices 112. In some embodiments, the retention mechanism, engagement device, or engagement member can be configured to move between an engaged position and a disengaged position for engaging with or disengaging the cord. Accordingly, one or more of a variety of retention mechanisms can be embedded, enclosed, supported, or housed by the recess 340 of the hub 300.

Figure 18:
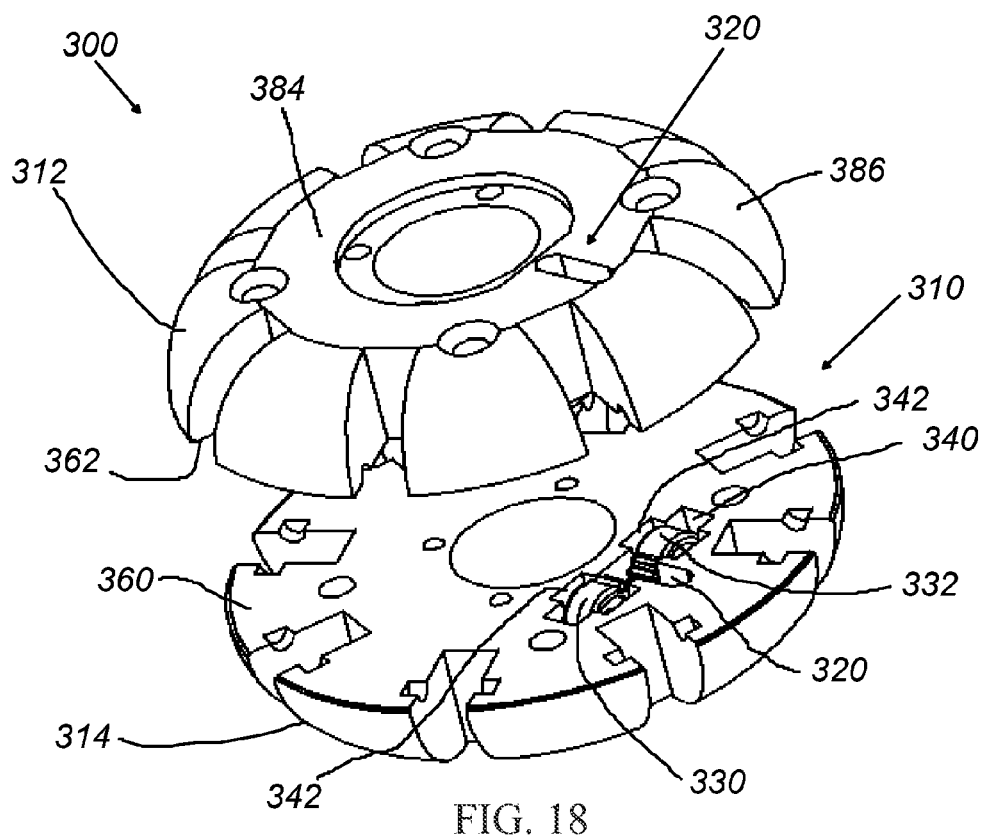
FIG. 18 is an exploded top perspective view of the umbrella hub of FIG. 17 illustrating upper and lower portions of the hub and components of the cord retention device, according to an embodiment.
Figure 19:
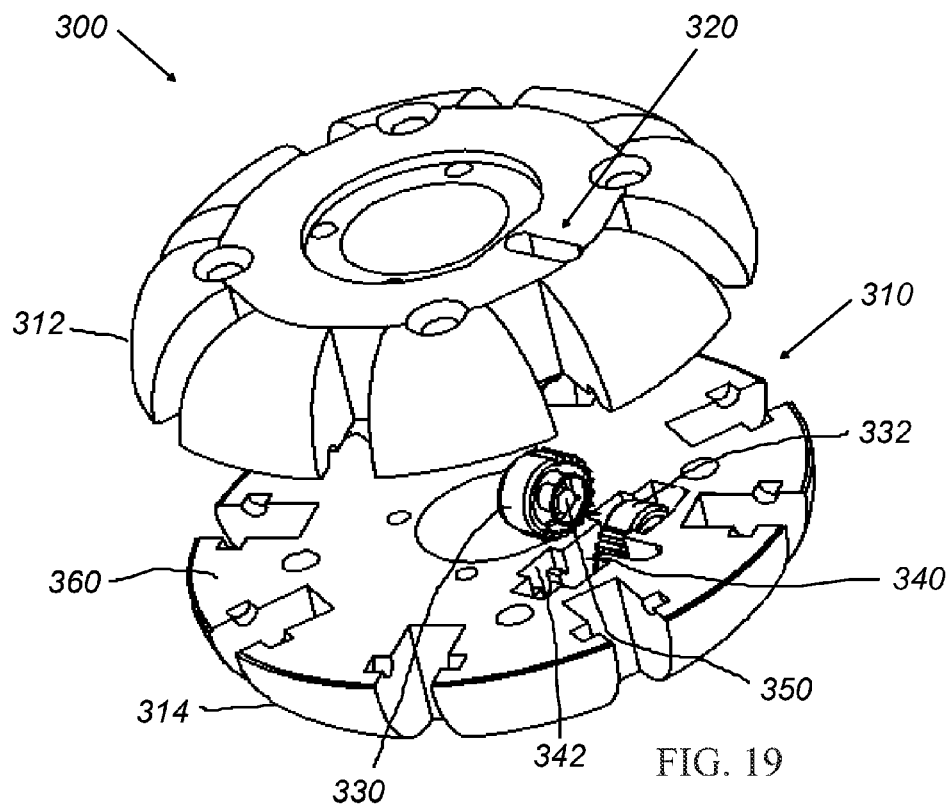
FIG. 19 is an exploded top perspective view of the umbrella hub of FIG. 17 illustrating the upper and lower portions of the hub and a component removed from the cord retention device, according to an embodiment.
Figure 20:
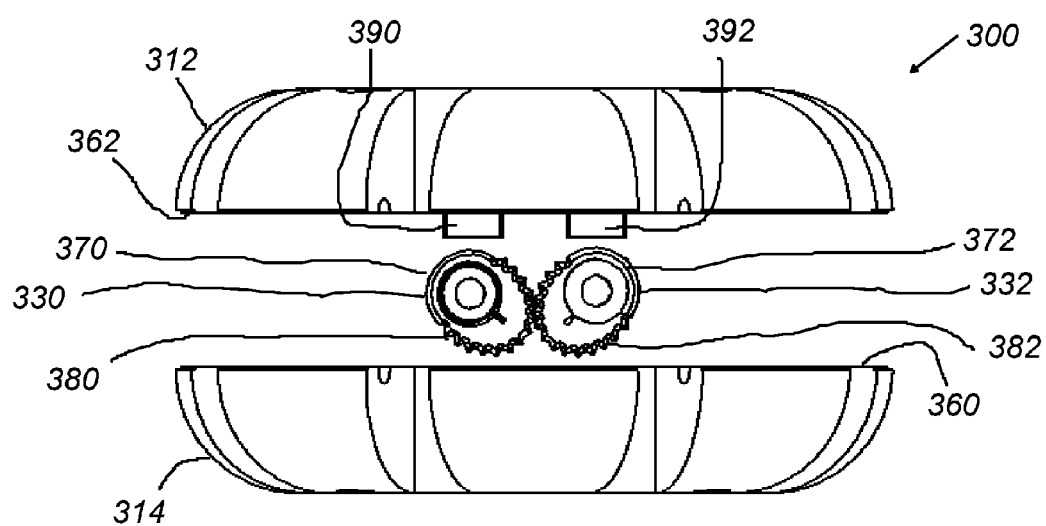
FIG. 20 is an exploded side view of the umbrella hub of FIG. 17 illustrating the upper and lower portions of the hub and components of the cord retention device, according to an embodiment.

For example, as shown in FIGS. 18-20, the cord retention device 310 can be configured such that the engagement members 330, 332 are rotatable members that are disposed in the recess 340 of the hub 300. In particular, the lower hub portion 314 can be configured to include the recess 340 such that the engagement members 330, 332 can be disposed therein. Thus, the engagement members 330, 332 can be contained within the lower hub portion 314 of the hub 300. However, the upper hub portion 312 can also be configured to at least partially receive or contain a portion or the entirety of the engagement members 330, 332.

As shown in FIG. 19, the recess 340 can comprise one or more slots 342. The slots 342 can be configured to support at least a portion of the rotatable members 330, 332. As illustrated, the rotatable member 330 can comprise a portion 350, such as an axle, that is seated within the slots 342 of the recess 340 when the rotatable member 330 is positioned within the lower hub portion 314. In this manner, the rotatable member 330 can be enabled to rotate relative to the recess 340.

Referring again to FIG. 18, the recess 340 and the slots 342 can be configured such that the engagement members 330, 332 are positioned below and upper surface 360 of the lower hub portion 314. In such an embodiment, the lower surface 362 of the upper hub portion 312 need not include a recess corresponding to the recess 340 of the lower hub portion 314. Thus, the lower surface 362 of the upper hub portion 312 can be a generally flat surface. Alternatively, in an embodiment wherein the upper hub portion 312 includes a recess that contains the entirety of the engagement members 330, 332, the upper surface 360 of the lower hub portion 310 can be a generally flat surface. Such features provide advantages and benefits such as increased ease and decreased cost of manufacture.

According to some embodiments, the engagement members 330, 332 can be configured as cams, as shown in FIG. 20. Such an embodiment has numerous advantages.

For example, the cams can be configured to include smooth surfaces 370, 372 and toothed surfaces 380, 382. The embodiment shown in FIG. 20 is capable of engaging a cord to prevent upward movement of the cord. The smooth surfaces 370, 372 can allow forces exerted against the engagement members 330, 332 to also be passed through the smooth surfaces 370, 372 rather than only through the portion 350, such as an axle, of each of the engagement members 330, 332. In such an embodiment, the engagement members 330, 332 can sit in a recess (such as the recess 340), completely below the lower surface 362 of the upper hub portion 312 and the engagement members 330, 332 can rotate with the smooth surfaces 370, 372 contacting the lower surface 362 of the upper hub portion 312 without being constrained by contact or excessive friction with the lower surface 362.

In such an embodiment, the contact between the engagement members 330, 332 and the upper hub portion 312 can provide superior vertical support for the engagement members 330, 332, such that the upward force of the cord can be counteracted by a central portion of the body or a core structure 384 of the hub 300. The core structure 384 can represent the portion of the upper hub 300 that is radially inward of protrusions 386 of the hub 300.

Further, FIGS. 18-19 also show that the recess 340 of the cord retention device 310 can be spaced well within the perimeter of the hub 300. This spacing advantageously allows the cord retention device 310 to distribute forces throughout the core 384 of the hub 300 rather than concentrating such forces in weaker sections of the hub 300, such as the protrusions 386. This superior structural advantage can distribute forces more evenly and prevent flexion or failure of the hub 300. Accordingly, the hub 300 can withstand significantly greater forces and be used with larger and heavier umbrellas than other prior art cord retention devices that are positioned within or on an umbrella pole or on a hub. Further, the concentration of forces at the hub 300 and the distribution of forces throughout the hub 300 means that an umbrella structure incorporating the hub 300 can operate at greater loads and with longer mechanical life.

Referring again to FIG. 20, the upper hub portion can comprise a pair of insertion blocks 390, 392 that can be inserted at least partially into the recess 340. The insertion blocks 390, 392 can extend into the slots 342 of the recess 340 in order to prevent upward movement of the portions 350 of the engagement members 330, 332. This unique structure allows the axis of rotation of the engagement members 330, 332 to lie substantially below the upper surface 360 of the lower hub portion 314.

FIGS. 21A-22B illustrate other embodiments of the slots, recesses, and insertion blocks. For example, FIGS. 21A-B illustrate a separated and an assembled configuration of the upper and lower hub portions 400, 402. As shown, the recess can comprise a slot 404 that is configured to receive an insertion block 408 extending downwardly from a lower surface 410 of the upper hub portion 400. A portion 412, such as an axle, of an engagement member can be received into the slot 404 for supporting the engagement member. When the upper and lower hub portions 400, 402 are coupled together, as shown in FIG. 21B, the insertion block 408 extends into the slot 404. As in many of the embodiments using insertion blocks, the fit between the insertion block and the slot can secure the engagement member in the horizontal plane relative to the hub and provide a manner of securing the upper and lower hub portions in the horizontal plane relative to each other.

FIGS. 22A-B illustrate another embodiment of upper and lower hub portions 440, 442. The lower hub portion 442 can comprise a pair of slots 444, 446. The slots 444, 446 can be configured to receive corresponding portions 450 of engagement members. In accordance with the illustrated embodiments and others disclosed herein, the portions 450 can be resiliently biased.

For example, as shown in FIGS. 22A-B, the portions 450 can converge toward each other due to the action of biasing mechanisms 452, 454. The biasing mechanisms 452, 454 can be configured as coil springs, leaf springs, or other such mechanisms. Thus, the portions 450 can separate horizontally in response to a downward force. However, the portions 450 (and the engagement mechanisms) can move upward and converge toward each other, thus converging onto a cord placed therebetween, to engage the cord.

In some embodiments, the portions 450 can be axles of rotatable engagement mechanisms. However, in some embodiments, the engagement mechanisms can be non-rotatable and the portions can represent protrusions or sections of the engagement mechanisms that can be coupled with the slots for attaching the engagement mechanism to the slot. Accordingly, non-rotatable engagement mechanisms could also be provided with the ability to engage with the cord due to upward convergence of the engagement mechanisms. Further, non-rotatable engagement mechanisms could disengage with the cord upon downward divergence against the force of the biasing mechanisms.

FIGS. 23A-24 illustrate the hub 300 in exploded view and in operation with a cord 500. As shown in FIG. 23A, the engagement members 330, 332 can be positioned at a rotational orientation that allows the cord 500 to pass freely therebetween. Accordingly, FIG. 23A illustrates the position of the engagement members 330, 332 when the cord 500 is moved downwardly, such as when the umbrella is being opened. More generally, the configuration of FIG. 23A corresponds to one in which a downward force applied to a portion of the cord 500 below the engagement members 330, 332 exceeds a load applied to another portion of the cord above the engagement members 330, 332. The force above the engagement members 330, 332 can correspond to the weight of an umbrella canopy and corresponding frame structure. FIG. 23A shows an arrow indicating a net downward force, which may cause the elevation of the hub 300 to be raised.

FIG. 23B illustrates a detailed view of the aperture 320. In some embodiments, the aperture 320 can comprise an engaging portion 502 and a disengaging portion 504. When in the engaging portion 502, the cord 500 can be radially aligned with and therefore engage with the engagement members 330, 332. However, when in the disengaging portion 504, the cord 500 can be radially misaligned with, separated from, and disengaged with the engagement members 330, 332. Accordingly, the cord can move in only one direction when in the engaging portion 502 of the aperture 320 and the cord can move either up or down when in the disengaging portion 504 of the aperture.

In some embodiments, the aperture 320 can extend through the central portion or core 384 of the body of the hub 300. The aperture 320 can pass through the hub 300 radially inward of protrusions 386 of the hub 300 and being spaced from the central opening of the hub 300 through which the umbrella pole passes. In some embodiments, the aperture 320 does not intersect or pass into the protrusions 386 of the hub 300.

Further, the engaging portion 502 can be positioned radially inwardly of the disengaging portion 504 of the hub to reduce and/or eliminate any moment about the hub 300 created by forces acting on the hub 300. The forces generated during use of the cord retention device 310 can be distributed efficiently and evenly through the core 384 of the hub 300. This unique structure can prevent stress concentrations in the protrusions 386, which already experience loading due to the interconnection with ribs of the umbrella. Accordingly, the structure may tend to mitigate and/or eliminate failure in the hub 300 attributable to the forces exerted on the hub body via the cord 500.

FIG. 24 illustrates the engagement of the engaging members 330, 332 with the cord 500 as the cord 500 experiences an upward force. The cord 500 is therefore seized upon by the toothed surfaces of the engagement members 330, 332 as the engagement members 330, 332 rotate inwardly toward the cord 500 and the cams thereof converge onto the cord 500. The configuration of FIG. 24 is one in which the one in which an upward force applied to a portion of the cord 500 by a load above the engagement members 330, 332 exceeds a force applied to another portion of the cord below the engagement members 330, 332. This is shown as a net upward force by the arrow in FIG. 24. The net upward force causes upward movement of the cord 500, which cause the toothed surfaces 380, 382 to engage the cord 500 with progressively grater force until a force equal to the upward force results. Downward movement from a relatively high elevation can be provided by moving the cord 500 radially outward from the engaging portion 502 of the aperture 320 to the disengaging portion 504 of the aperture 320. See FIG. 23B.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An umbrella hub comprising:
a hub body comprising an upper hub portion and a lower hub portion coupled to the upper portion, the hub body having a series of projections extending outwardly from a central portion thereof;
an aperture extending through the upper and lower hub portions of the hub body, the aperture being configured to allow a cord to pass therethrough;
an engagement device configured for engaging with or disengaging the cord, the engagement device being aligned with the aperture of the hub body such that the cord can be disposed through the aperture to be engaged with or disengaged from the engagement device, the engagement device allowing the cord to pass freely in a first direction through the aperture while preventing movement of the cord in a second direction opposite the first direction; and
a recess enclosed within the hub body and formed in the lower hub portion, the recess being configured to at least partially receive the engagement device therein and to allow the engagement device to move between the engaged position and the disengaged position;
wherein the upper hub portion comprises at least one insertion member configured to be inserted into the recess of the lower hub portion.

2. The umbrella hub of claim 1, wherein the aperture comprises an engaging section and a disengaging section, the engaging section being aligned with the engagement device such that the engagement device can engage with the cord to prevent movement of the cord in the second direction, the disengaging section being misaligned with the engagement device such that the cord can move freely in the first or second direction.

3. The umbrella hub of claim 1, wherein the engagement device comprises a plurality of rotatable gear members configured to engage the cord.

4. The umbrella hub of claim 3, wherein the engagement members are cam-shaped.

5. The umbrella hub of claim 3, wherein the engagement members allow downward movement of the cord relative to the hub and prevent upward movement of the cord relative to the hub.

6. The umbrella hub of claim 1, wherein the engagement device is configured to move between an engaged position and a disengaged position for engaging with or disengaging the cord.

7. The umbrella hub of claim 1, wherein the engagement device is contained entirely within the lower hub portion.

8. The umbrella hub of claim 1, wherein the insertion member is configured to be inserted into a slot formed within the recess, the insertion member providing a vertical restraint to restrain movement of at least a portion of the engagement member relative to the hub body.

9. The umbrella hub of claim 8, wherein a portion of the engagement device is constrained against horizontal and vertical movement within the recess.

10. An umbrella comprising:
an umbrella pole;
a first umbrella hub coupled with the umbrella pole;
a cord coupled with the first umbrella hub; and
a second umbrella hub comprising a first hub portion having a recess formed therein, a second hub portion being coupled with the first hub portion, a channel extending through the first and second hub portions of the hub body, the channel being configured to allow a cord to pass therethrough, and at least one engagement member disposed in the recess of the first hub portion and being at least partially enclosed between the first and second hub portions, the engagement member being configured for engaging with or disengaging from the cord, the engagement member being aligned with the channel of the hub body such that the cord can be disposed through the channel to be engaged with the engagement member, the engagement member allowing the cord to pass freely in a first direction through the channel while preventing movement of the cord in a second direction opposite the first direction; and
wherein a structure disposed downwardly from the second hub portion abuts and holds the engagement member against the first hub portion.

11. The umbrella of claim 10, wherein the channel comprises an engaging section and a disengaging section, the engaging section being aligned with the engagement member such that the engagement member can engage with the cord to prevent movement of the cord in the second direction, the disengaging section being misaligned with the engagement member such that the cord can move freely in the first or second direction.

12. The umbrella of claim 10, wherein the at least one engagement member comprises a pair of rotatable gear members configured to engage the cord.

13. The umbrella of claim 12, wherein the gear members allow downward movement of the cord relative to the hub and prevent upward movement of the cord relative to the hub.

14. The umbrella hub of claim 12, wherein the rotatable gear members are cylindrically shaped.

15. The umbrella of claim 10, wherein the engagement member is configured to an engaged position and a disengaged position for engaging with or disengaging from the cord.

16. The umbrella hub of claim 10, wherein the first hub portion is a lower hub portion.

17. The umbrella hub of claim 16, wherein the engagement members are contained entirely within the lower hub portion.

18. An umbrella comprising:
an umbrella pole;
a cord coupled with the umbrella pole; and
an umbrella hub comprising a cord channel, a lower surface and an upper surface, the hub further comprising a plurality of connection cavities that extend from the lower surface to the upper surface, the connection cavities configured to receive ribs of the umbrella, the channel being disposed at least partially between the upper and lower surfaces of the hub and being configured to allow the cord to pass therethrough, a recess formed between the upper and lower surfaces of the hub, and at least one engagement member disposed in the recess of the hub, the engagement member being configured to rotate about an axis fixed relative to the umbrella hub and to engage with or disengage from the cord, the engagement member being aligned with the channel of the hub such that the cord can be disposed through the channel to be engaged with the engagement member, the engagement member allowing the cord to pass freely in a first direction through the channel while preventing movement of the cord in a second direction opposite the first direction.

19. The umbrella of claim 18, wherein the at least one engagement member comprises an axle and a cord gripping surface coupled with the axle for rotation toward and away from the cord.

20. The umbrella of claim 19, wherein the umbrella hub comprises a lower hub portion and an upper hub portion and the recess comprises a seating portion formed on an upper surface of the lower hub portion configured to seat the axle.

21. The umbrella of claim 20, wherein the recess comprises a seating portion formed on a lower surface of the upper hub portion such that the axle is seated within the recess between the seating portions of the upper and lower hub portions.

22. The umbrella of claim 20, wherein the seating portion comprises first and second seating portions, wherein the first seating portion is configured to seat a first end of the axle and the second seating portion is configured to seat a second end of the axle.

23. The umbrella of claim 22, wherein the seating portions comprise slots configured to support the axle.

24. The umbrella of claim 19, wherein the umbrella hub comprises a lower hub portion and an upper hub portion and the recess comprises a seating portion formed between an upper surface and lower surface of the lower hub portion configured to seat the axle such that an axis of rotation of the at least one engagement member lies substantially below the upper surface of the lower hub portion.

* * * * *